(12) United States Patent
Kim et al.

(10) Patent No.: US 8,884,893 B2
(45) Date of Patent: Nov. 11, 2014

(54) MOBILE TERMINAL AND METHOD FOR CONTROLLING THE SAME

(75) Inventors: Taehun Kim, Incheon (KR); Jieun Park, Seoul (KR); Nayoung Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 464 days.

(21) Appl. No.: 13/220,947

(22) Filed: Aug. 30, 2011

(65) Prior Publication Data
US 2012/0154447 A1 Jun. 21, 2012

(30) Foreign Application Priority Data
Dec. 17, 2010 (KR) .................. 10-2010-0129820

(51) Int. Cl.
G06F 3/041 (2006.01)
G09G 5/00 (2006.01)
G06F 1/16 (2006.01)
G06F 3/0488 (2013.01)

(52) U.S. Cl.
CPC .......... G06F 3/04883 (2013.01); G06F 1/1626 (2013.01)
USPC .......................................... 345/173; 345/212

(58) Field of Classification Search
USPC ............................ 345/173, 178, 179; 715/702
See application file for complete search history.

(56) References Cited

U.S. PATENT DOCUMENTS

| 2005/0052427 A1* | 3/2005 | Wu et al. .................. 345/173 |
| 2009/0228841 A1 | 9/2009 | Hildreth |
| 2010/0026649 A1 | 2/2010 | Shimizu et al. |
| 2010/0306649 A1* | 12/2010 | Russ et al. ............... 715/702 |

FOREIGN PATENT DOCUMENTS

WO WO 2007/061057 5/2007

OTHER PUBLICATIONS

European Search Report dated Jun. 4, 2013.
Multi-Finger and Whole Hand Gestural Interaction Techniques for Multi-User Tabletop Displays; Mike Wu et al.; ACM Symposium on User Interface Software Technology; vol. 5, Issue No. 2; Nov. 2, 2003; pp. 193-202; XP-002394716; ISBN: 978-1-58113-636-4.
Smartskin: An Infrastructure for Freehand Manipulation on Interactive Surfaces; Jun Rekimoto; CHI Conference Proceedings, Human Factors in Computing Systems; vol. 4, Issue No. 1; Apr. 20, 2002; pp. 113-120; XP-001099406; ISBN: 978-1-58113-453-7.

* cited by examiner

*Primary Examiner* — Michael Faragalla
(74) *Attorney, Agent, or Firm* — Ked & Associates, LLP

(57) ABSTRACT

A mobile terminal and a method for controlling the same are provided. The mobile terminal may include a touchscreen that displays at least one content item on a screen and that receives an area touch motion corresponding to a particular area of the screen, and a controller that analyzes the area touch motion and controls a specific content item and content control operation corresponding to the received area touch motion accordingly. Control of such a mobile terminal may include displaying an execution screen of an application, receiving an area touch motion corresponding to one area of the execution screen, analyzing the area touch motion, and controlling an application corresponding to the received area touch motion accordingly.

18 Claims, 36 Drawing Sheets

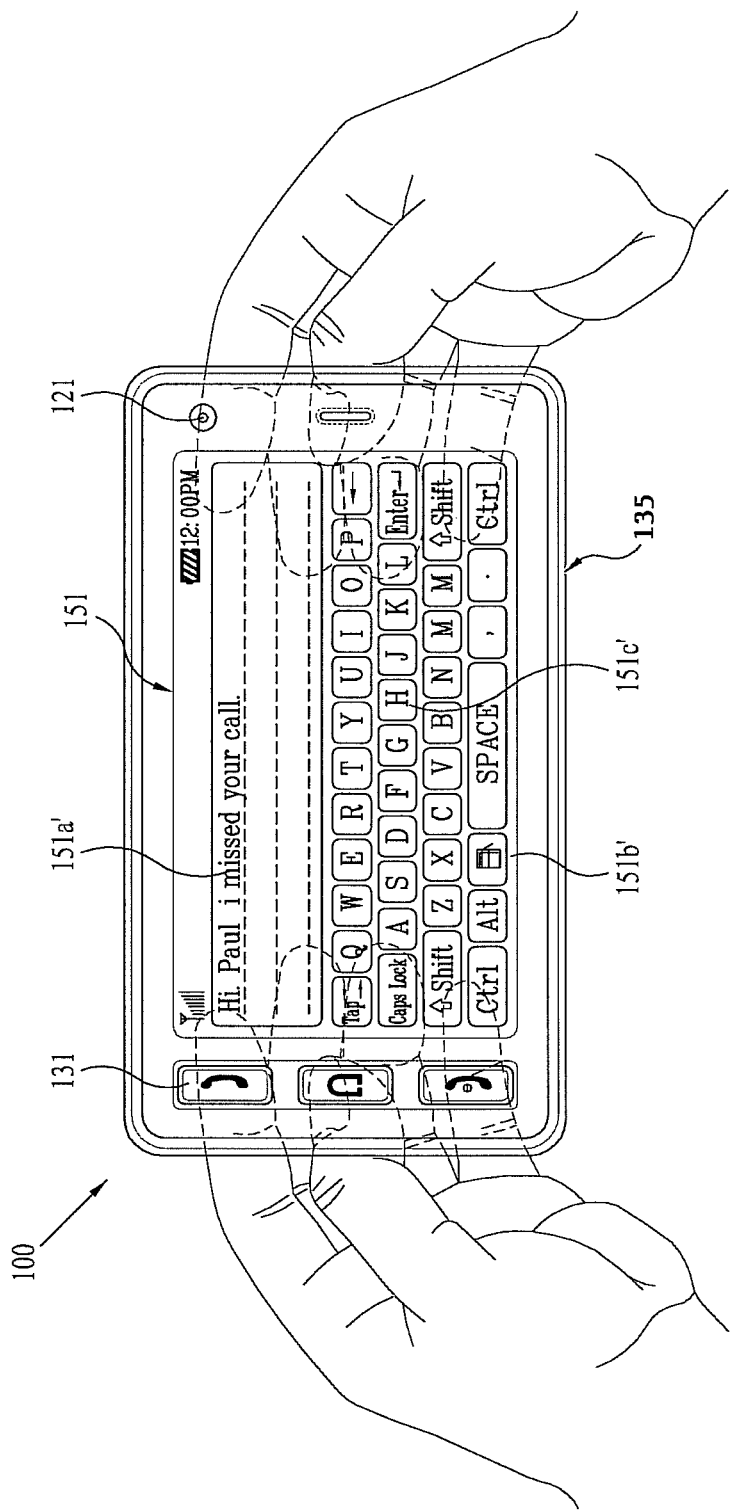

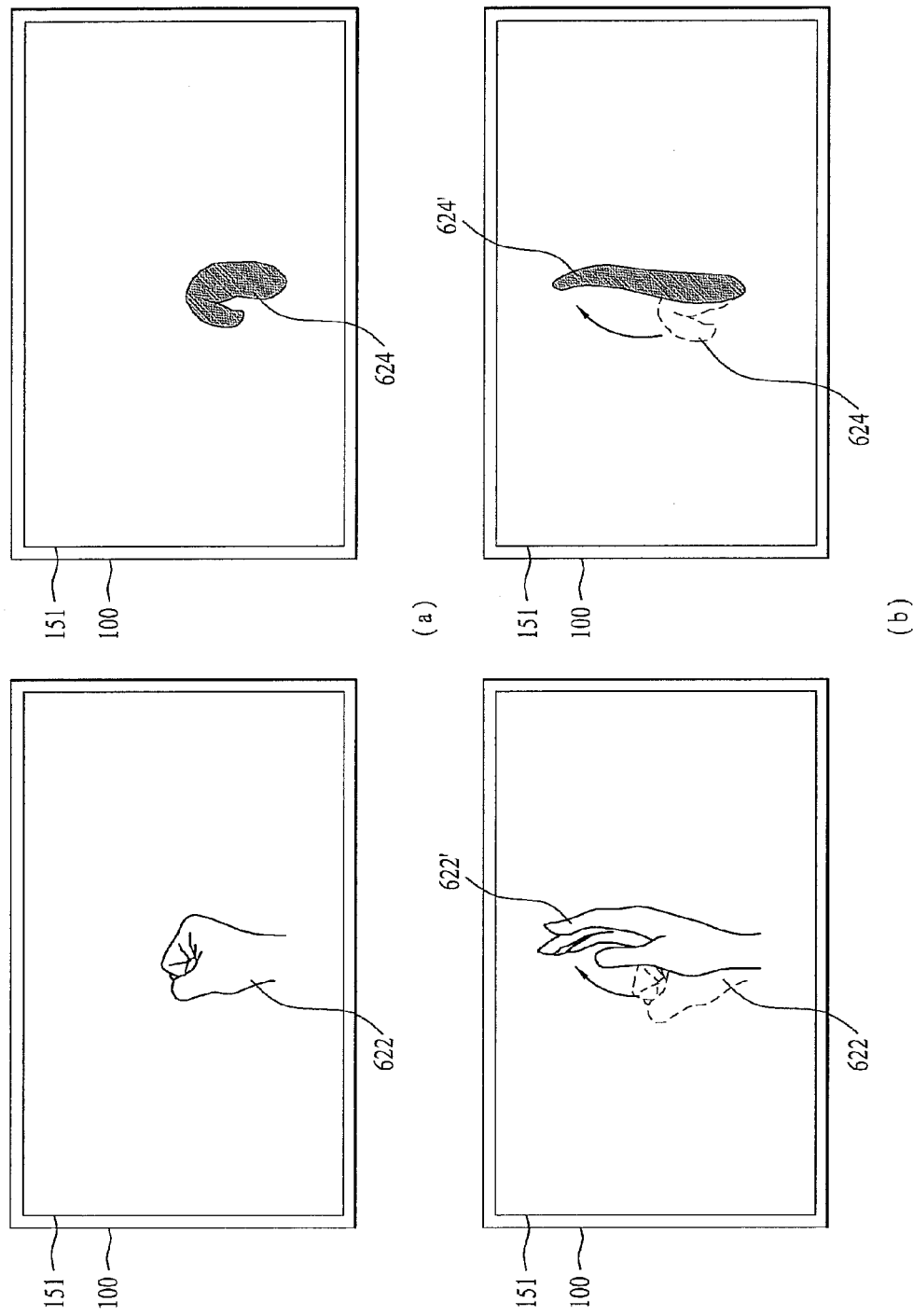

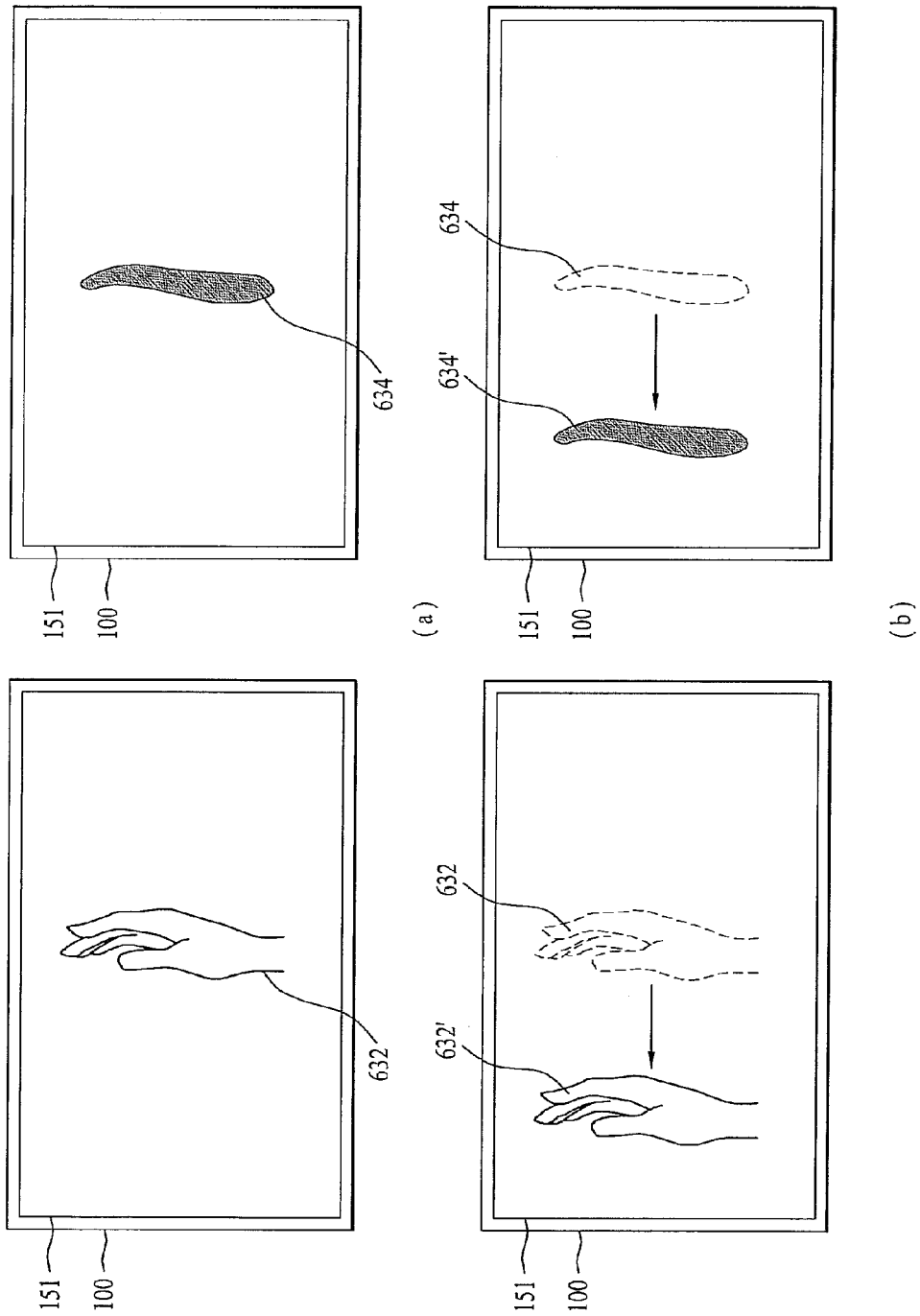

(a)

(b)

(a)

(b)

(a)

(b)

(a)

(b)

(c)

(a)

(b)

(a)

(b)

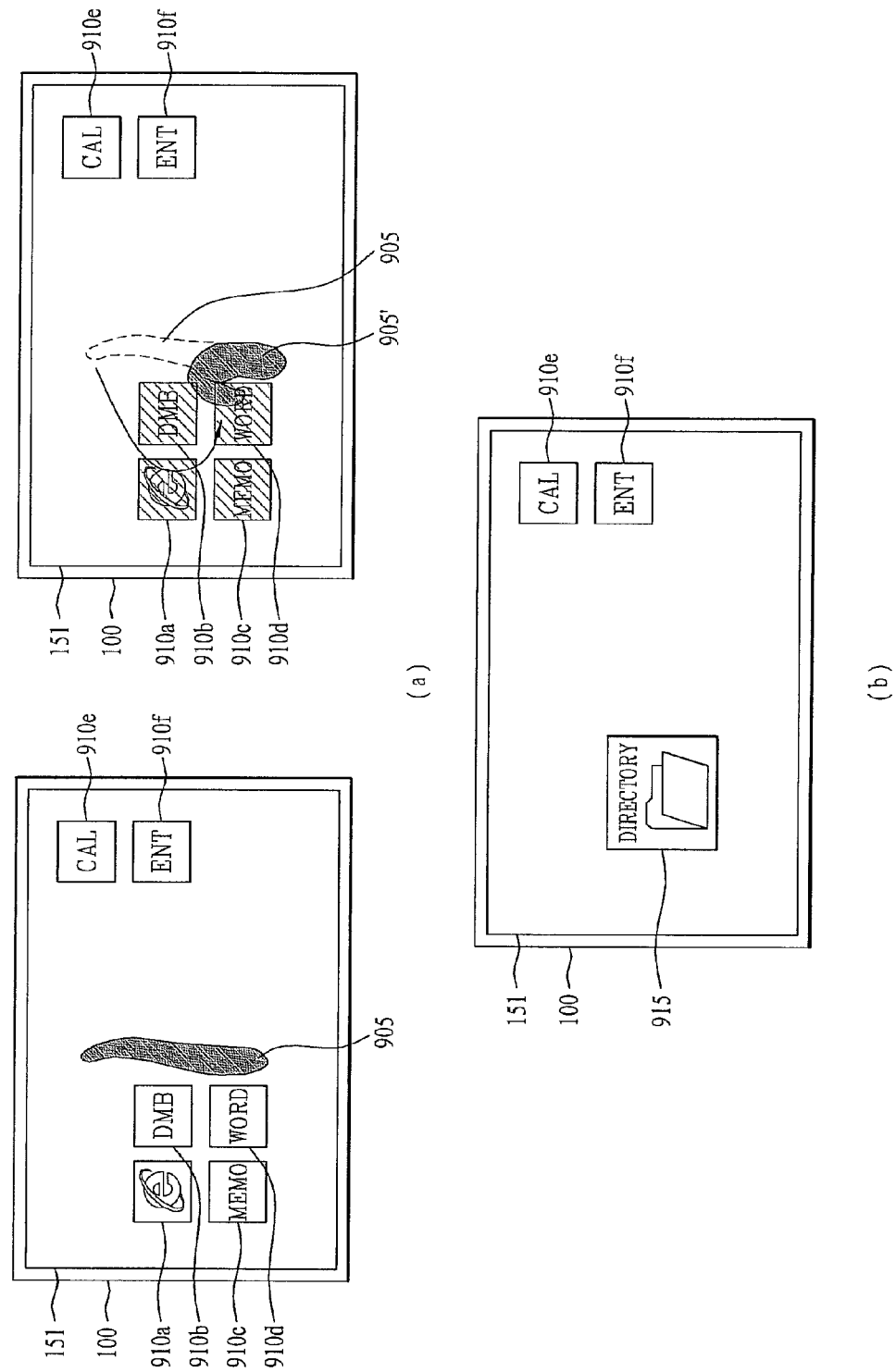

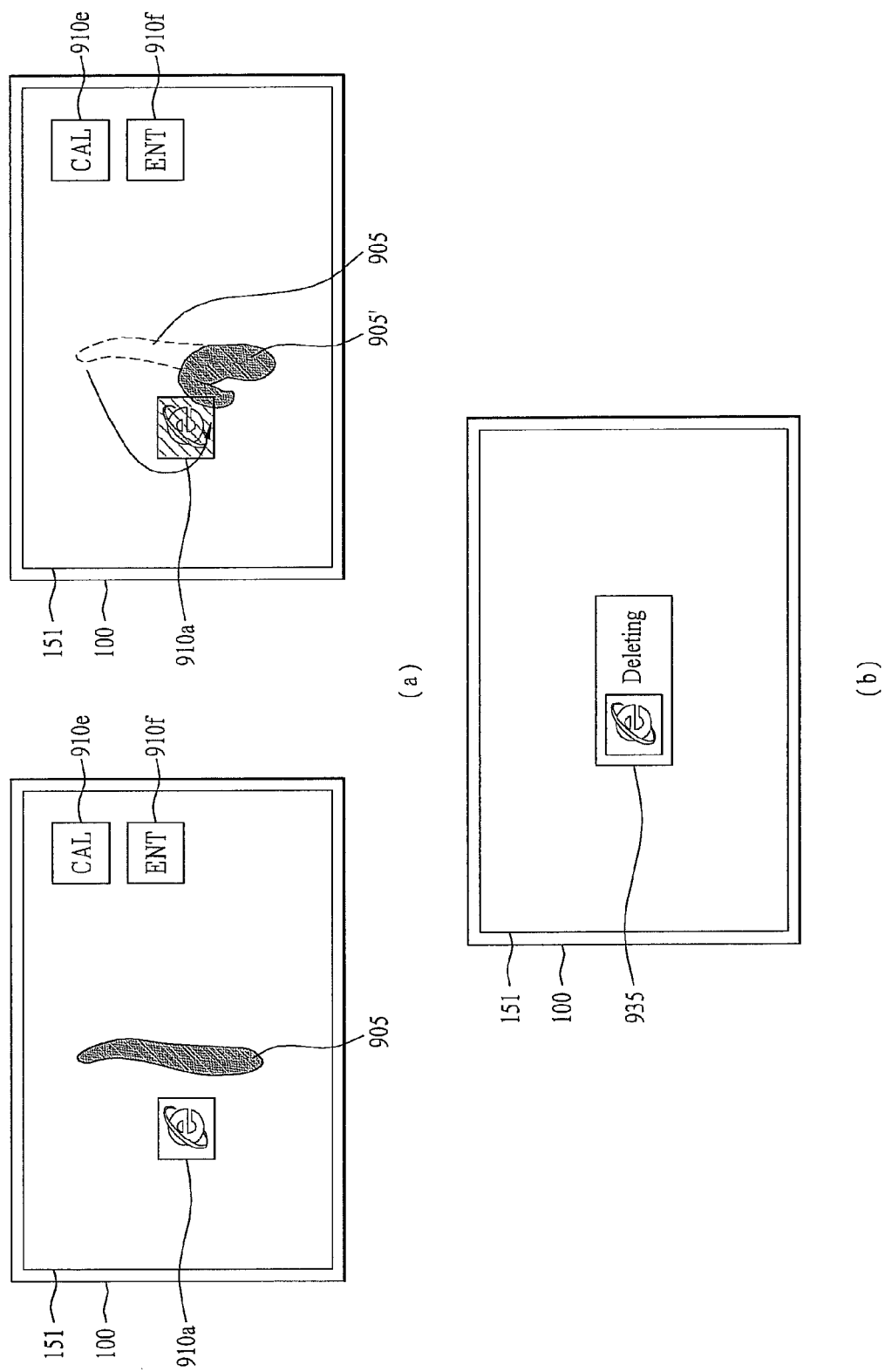

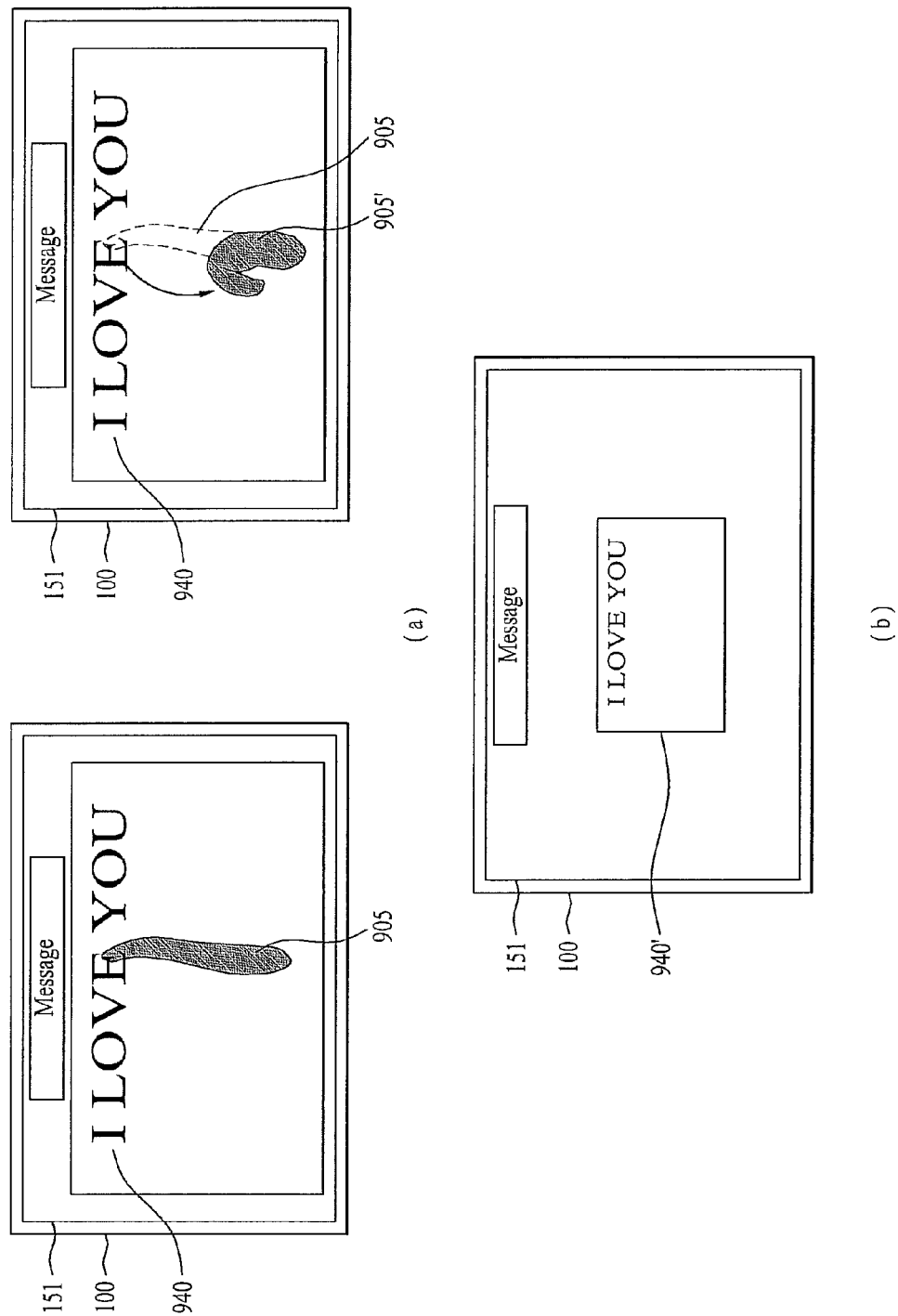

(a)

(b)

(a)

(b)

(c)

(a)

(b)

(a)

(b)

(a)

(b)

(a)

(b)

(a)

(b)

(a)

(b)

(a)

(b)

(c)

(a)

(b)

(c)

MOBILE TERMINAL AND METHOD FOR CONTROLLING THE SAME

CROSS-REFERENCE TO RELATED APPLICATION(S)

This application claims the benefit of the Korean Patent Application No. 10-2010-0129820, filed in Korea on Dec. 17, 2010, which is hereby incorporated by reference as if fully set forth herein.

BACKGROUND

1. Field

This relates to a mobile terminal and, more particularly, to a mobile terminal and a method for controlling the same that utilizes an area touch method.

2. Background

Generally, mobile terminals may include handheld terminals, vehicle mounted terminals and the like to provide a given level of portability. Such terminals may include, for example, a multimedia player provided with composite functions such as photographing of still or moving subjects, playback of music or video files, game play, broadcast reception and the like. To enhance these terminal functions, structural and/or software improvements may be considered.

BRIEF DESCRIPTION OF THE DRAWINGS

The embodiments will be described in detail with reference to the following drawings in which like reference numerals refer to like elements wherein:

FIGS. 2A and 2B are front views of a mobile terminal according to one embodiment as broadly described herein;

FIGS. 6A to 6E illustrate exemplary hand motions and respective area touches within the touchscreen according to an embodiment as broadly described herein;

FIGS. 9A to 9D illustrate exemplary display control operations corresponding to a second touch pattern according to an embodiment as broadly described herein;

DETAILED DESCRIPTION

Reference will now be made in detail to various embodiments, examples of which are illustrated in the accompanying drawings. Wherever possible, the same reference numbers will be used throughout the drawings to refer to the same or like parts. The suffixes 'module' and 'unit' used in the following description simply for ease of discussion in this disclosure.

Mobile terminals as embodied and broadly described herein may include a mobile phone, a smart phone, a laptop computer, a digital broadcast terminal, a PDA (personal digital assistant), a PMP (portable multimedia player), a navigation system, and other such terminals. Except in cases which may be applicable only to mobile terminals, it may be understood to those skilled in the art that embodiments as broadly described herein may also be applicable to a stationary terminal such as a digital TV, a desktop computer and the like.

Figure 1:
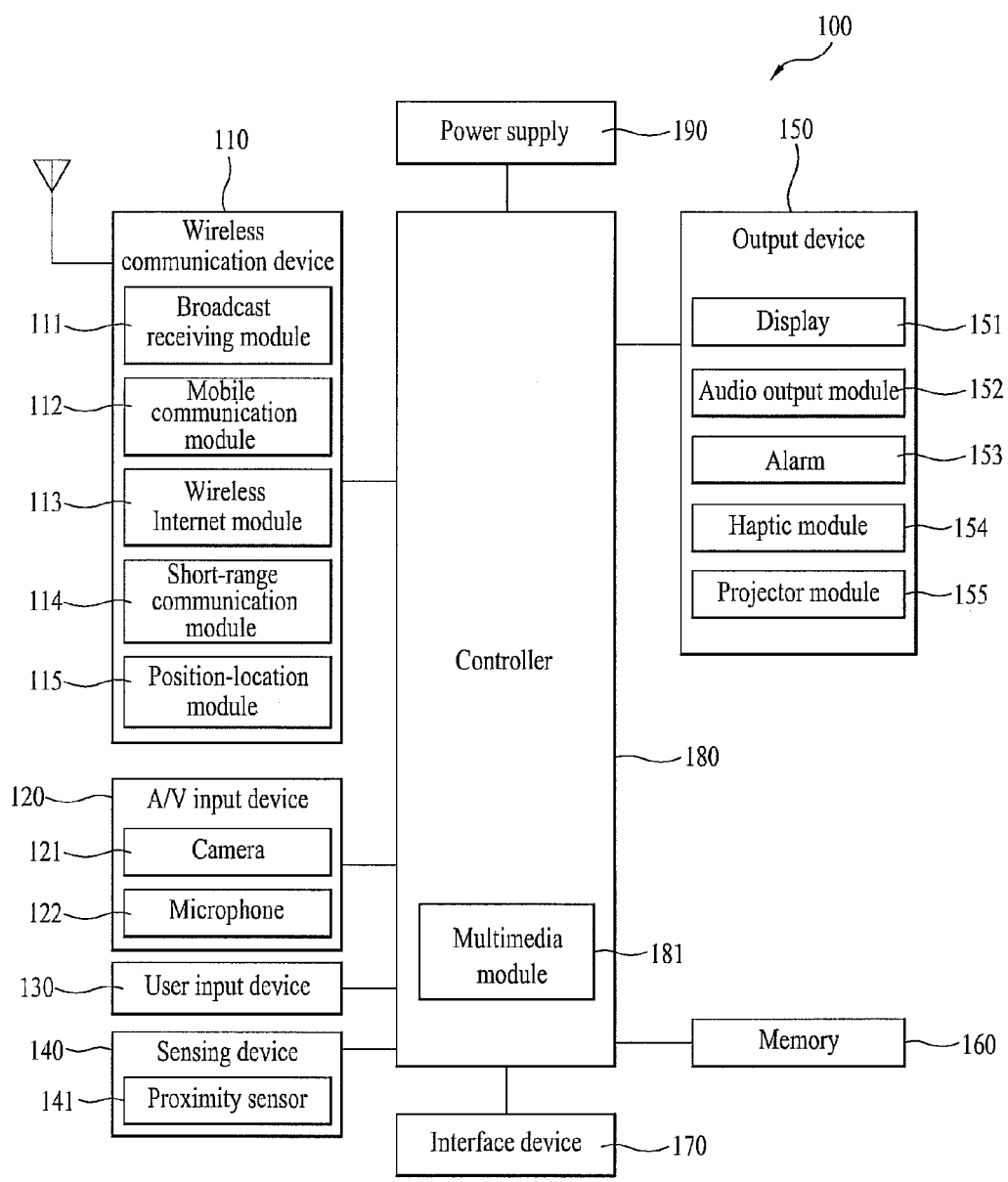
FIG. 1 is a block diagram of a mobile terminal according to one embodiment as broadly described herein.

Referring to FIG. 1, a mobile terminal 100 according to one embodiment as broadly described herein may include a wireless communication device 110, an A/V (audio/video) input device 120, a user input device 130, a sensing device 140, an output device 150, a memory 160, an interface device 170, a controller 180, a power supply 190 and the like. FIG. 1 shows the mobile terminal 100 having various exemplary components, but it is understood that implementing all of the illustrated components is not necessarily required, and greater or fewer components may alternatively be implemented.

The wireless communication device 110 may include one or more components which provide for wireless communication between the mobile terminal 100 and a wireless communication system or network within which the mobile terminal 100 is located. For instance, the wireless communication device 110 may include a broadcast receiving module 111, a mobile communication module 112, a wireless internet module 113, a short-range communication module 114, a position-location module 115 and other such modules.

The broadcast receiving module 111 may receive a broadcast signal and/or broadcast associated information from an external broadcast managing server via a broadcast channel. The broadcast channel may include, for example, a satellite channel and/or a terrestrial channel. A broadcast managing server may generate and transmit a broadcast signal and/or broadcast associated information, or may transmit a previously generated broadcast signal and/or broadcast associated information to a terminal. The broadcast signal may be implemented as, for example, a TV broadcast signal, a radio broadcast signal, and a data broadcast signal, among others. The broadcast signal may also include a broadcast signal combined with a TV or radio broadcast signal.

The broadcast associated information may include information associated with a broadcast channel, a broadcast program, a broadcast service provider, etc. The broadcast associated information may be provided via a mobile communication network. In this case, the broadcast associated information may be received by the mobile communication module 112.

The broadcast associated information may be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. Such broadcasting systems may include, for example, digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Alternatively, the broadcast receiving module 111 may be suitable for other broadcasting systems as well as the above-explained digital broadcasting systems.

The broadcast signal and/or broadcast associated information received by the broadcast receiving module 111 may be stored in a device, such as, for example, a memory 160.

The mobile communication module 112 may transmit/receive wireless signals to/from one or more network entities (e.g., base station, external terminal, server, etc.). Such wireless signals may represent, for example, audio, video, and data according to text/multimedia message transceivings, among others.

The wireless internet module 113 may support Internet access for the mobile terminal 100. This module may be internally or externally coupled to the mobile terminal 100. Such wireless Internet technology may include, for example, WLAN (Wireless LAN) (Wi-Fi), Wibro (Wireless broadband), Wimax (World Interoperability for Microwave Access), HSDPA (High Speed Downlink Packet Access), etc.

The short-range communication module 114 may facilitate relatively short-range communications. Suitable technologies for implementing this module may include, for example, radio frequency identification (RFID), infrared data association (IrDA), ultra-wideband (UWB), as well at networking technologies commonly referred to as Bluetooth and ZigBee, to name a few.

The position-location module 115 may identify or otherwise obtain the location of the mobile terminal 100. This module may include a global positioning system (GPS) module.

Referring to FIG. 1, the audio/video (NV) input device 120 may provide an audio or video signal input to the mobile terminal 100. The A/V input device 120 may include a camera 121 and a microphone 122. The camera 121 may receive and process image frames of still pictures or video, which are obtained by an image sensor in a video call mode or a photographing mode. The processed image frames may be displayed on a display 151 of the output device 150.

The image frames processed by the camera 121 may be stored in the memory 160 or may be externally transmitted via the wireless communication device 110. In certain embodiments, at least two cameras 121 may be provided to the mobile terminal 100, depending on an environment in which it is to be used.

The microphone 122 may receive an external audio signal while the portable device is in a particular mode, such as phone call mode, recording mode and voice recognition mode. This audio signal may be processed and converted into electronic audio data. The processed audio data may be transformed into a format transmittable to a mobile communication base station via the mobile communication module 112 in case of a call mode. The microphone 122 may include assorted noise removing algorithms to remove noise generated in the course of receiving the external audio signal.

The user input device 130 may generate input data responsive to user manipulation of an associated input device or devices. Examples of such devices may include a keypad, a dome switch, a touchpad (e.g., static pressure/capacitance), a jog wheel, a jog switch, etc.

The sensing device 140 may provide sensing signals for controlling operations of the mobile terminal 100 using status measurements of various aspects of the mobile terminal. For instance, the sensing device 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, and/or orientation or acceleration/deceleration of the mobile terminal 100. For example, in a slide-type mobile terminal, such a sensing device 140 may sense whether a sliding portion of the mobile terminal is open or closed. Other examples may include the sensing device 140 sensing the presence or absence of power provided by the power supply 190, the presence or absence of a coupling or other connection between the interface device 170 and an external device, and the like. The sensing device 140 may also include a proximity sensor 141.

The output device 150 may generate outputs relevant to the senses of sight, hearing, touch and the like. The output device 150 may include the display 151, an audio output module 152, an alarm 153, a haptic module 154, a projector module 155 and the like.

The display 151 may visually display (output) information associated with the mobile terminal 100. For instance, if the mobile terminal 100 is operating in a phone call mode, the display 151 may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of these and/or other types of displays.

Some of the above displays may be implemented in a transparent or optical transmittive type, which may be referred to as a transparent display. An example of a transparent display is a TOLED (transparent OLED) or the like. A rear configuration of the display 151 may be implemented in the optical transmittive type as well. In this configuration, a user is able to see an object in rear of a terminal body via the area occupied by the display 151 of the terminal body.

In certain embodiments, at least two displays 151 may be provided with the mobile terminal 100. For instance, a plurality of displays may be arranged on a single face of the mobile terminal 100, spaced apart from each other or being built in one body. Alternatively, a plurality of displays may be arranged on different faces of the mobile terminal 100.

If the display 151 and a sensor for detecting a touch action (hereinafter called 'touch sensor') are formed in a mutual layer structure (hereinafter called touchscreen the display 151 may be used as an input device as well as an output device. In this case, the touch sensor may be configured as a touch film, a touch sheet, a touchpad or the like.

The touch sensor may convert a pressure applied to a specific portion of the display 151 or a variation of a capacitance generated from a specific portion of the display 151 to an electric input signal. Moreover, the touch sensor may detect a pressure of a touch as well as a touched position or size.

If a touch input is made to the touch sensor, signal(s) corresponding to the touch may be transferred to a touch controller. The touch controller may process the signal(s) and then transfer the processed signal(s) to the controller 180. Therefore, the controller 180 may know whether a prescribed portion of the display 151 is touched.

Referring to FIG. 1, the proximity sensor 141 be provided, for example, at an internal area of the mobile terminal 100 enclosed by the touchscreen or around the touchscreen. The proximity sensor 141 may detect a presence or non-presence of an object approaching a prescribed detecting surface or an object existing around the proximity sensor using an electromagnetic field strength or infrared ray without mechanical contact. Hence, durability of the proximity sensor 141 may be better than that of a contact type sensor and also may have greater utility than that of the contact type sensor.

The proximity sensor 141 may be one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touchscreen includes the electrostatic capacity proximity sensor, it may detect the proximity of a pointer using a variation in electric field according to the proximity of the pointer. In this case, the touchscreen (touch sensor) can be considered the proximity sensor.

In the following description, an action in which a pointer approaches a touchscreen without actually contacting the touchscreen but being recognized as corresponding to a location on the touchscreen will be referred to as a 'proximity touch'. An action that a pointer actually touches the touchscreen will be referred to as a 'contact touch'. When the touchscreen is proximity-touched by the pointer, the position of the pointer which vertically opposes the touchscreen will be considered to correspond to the proximity touch.

The proximity sensor may detect a proximity touch and a proximity touch pattern (e.g., a proximity touch distance, a proximity touch duration, a proximity touch position, a proximity touch shift state, a proximity touch trajectory etc.). Information corresponding to the detected proximity touch action and the detected proximity touch pattern may be outputted to the touchscreen.

The audio output module 152 may function in various modes including a call-receiving mode, a call-placing mode, a recording mode, a voice recognition mode, a broadcast reception mode and other such modes to output audio data which is received from the wireless communication device 110 or is stored in the memory 160. During operation, the audio output module 152 outputs audio relating to a particular function (e.g., call received, message received, etc.). The audio output module 152 may include one or more speakers, buzzers, other audio producing devices, and combinations thereof.

The alarm 153 may output a signal for announcing the occurrence of a particular event associated with the mobile terminal 100. Such events may include, for example, a call received event, a message received event and a touch input received event. The alarm 153 may output a signal for announcing the event occurrence by way of vibration as well as video and/or audio signal. The video and/or audio signal may be outputted via the display 151 or the audio output module 152. Hence, the display 151 or the audio output module 152 may, in certain embodiments, be regarded as a part of the alarm 153.

The haptic module 154 may generate various tactile effects that may be sensed by a user. For example, vibration may be one of the tactile effects generated by the haptic module 154. Strength and pattern of the vibration generated by the haptic module 154 may be controllable. For instance, different vibrations may be outputted, and may be synthesized together or may be outputted in sequence.

The haptic module 154 may generate various tactile effects in addition to vibration. For instance, the haptic module 154 may generate an effect attributed to the arrangement of pins vertically moving against a skin contact surface, an effect attributed to the injection/suction power of air though an injection/suction hole, an effect attributed to a skim over a skin surface, an effect attributed to contact with an electrode, an effect attributed to an electrostatic force, an effect attributed to a hot/cold sense using an endothermic or exothermic device, and other such effects as appropriate.

The haptic module 154 may allow a user to sense the tactile effect through a muscle sense of a finger, arm or other such part, and may transfer the tactile effect through direct contact. In certain embodiments, at least two haptic modules 154 may be provided to the mobile terminal 100 depending on the particular type of mobile terminal 100.

The projector module 155 may perform an image projection function using the mobile terminal 100. The projector module 155 may display an image, which is substantially identical to or slightly different from the image displayed on the display 151, on an external screen or wall according to a control signal of the controller 180.

The memory 160 may store various types of data to support the processing, control, and storage requirements of the mobile terminal 100. Examples of such data may include program instructions for applications operating on the mobile terminal 100, contact data, phonebook data, messages, audio, still pictures, moving pictures, etc. Recent use history or a cumulative use frequency of each data item (e.g., use frequency for each phonebook, each message or each multimedia item) may be stored in the memory 160. Moreover, data for various patterns of vibration and/or sound outputted associated with a touch input to the touchscreen may be stored in the memory 160.

The memory 160 may include any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 may operate in association with a web storage system for performing a storage function of the memory 160 on the Internet.

The interface device 170 may couple the mobile terminal 100 with various external devices. The interface device 170 may receive data from the external devices or may be supplied with power and then transfer data or power to respective elements of the mobile terminal 100 or enable data within the mobile terminal 100 to be transferred to the external devices. The interface device 170 may be configured using a wired/wireless headset port, an external charger port, a wired/wireless data port, a memory card port, a port for coupling to a device having an identity module, audio input/output ports, video input/output ports, an earphone port and/or other types/combinations of parts as appropriate.

The memory 160 may include an identity module chip for storing various kinds of information for authenticating use authority of the mobile terminal 100, and may include User Identify Module (UIM), Subscriber Identify Module (SIM), Universal Subscriber Identity Module (USIM) and/or the like. A device having the identity module (hereinafter called 'identity device') may be manufactured as a smart card. Therefore, the identity device may be connectable to the mobile terminal 100 via the corresponding port.

When the mobile terminal 110 is connected to an external cradle, the interface device 170 may become a passage for supplying the mobile terminal 100 with power from the cradle or a passage for delivering various command signals inputted at the cradle by a user to the mobile terminal 100. Each of the various command signals inputted at the cradle or the power may operate as a signal enabling the mobile terminal 100 to recognize that it is correctly loaded in the cradle.

The controller 180 may control overall operation of the mobile terminal 100. For example, the controller 180 may perform the control and processing associated with voice calls, data communications, video calls, etc. The controller 180 may include a multimedia module 181 that provides multimedia playback. The multimedia module 181 may be configured as part of the controller 180, or may be implemented as a separate component.

Moreover, the controller 180 may perform a pattern recognizing process for recognizing a written input and a picture drawing input carried out on the touchscreen as characters or images, respectively.

The power supply 190 may provide power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes may be implemented with a software application written in any suitable programming language and may be stored in memory such as the memory 160, and executed by a controller or processor, such as the controller 180.

Figure 2A:
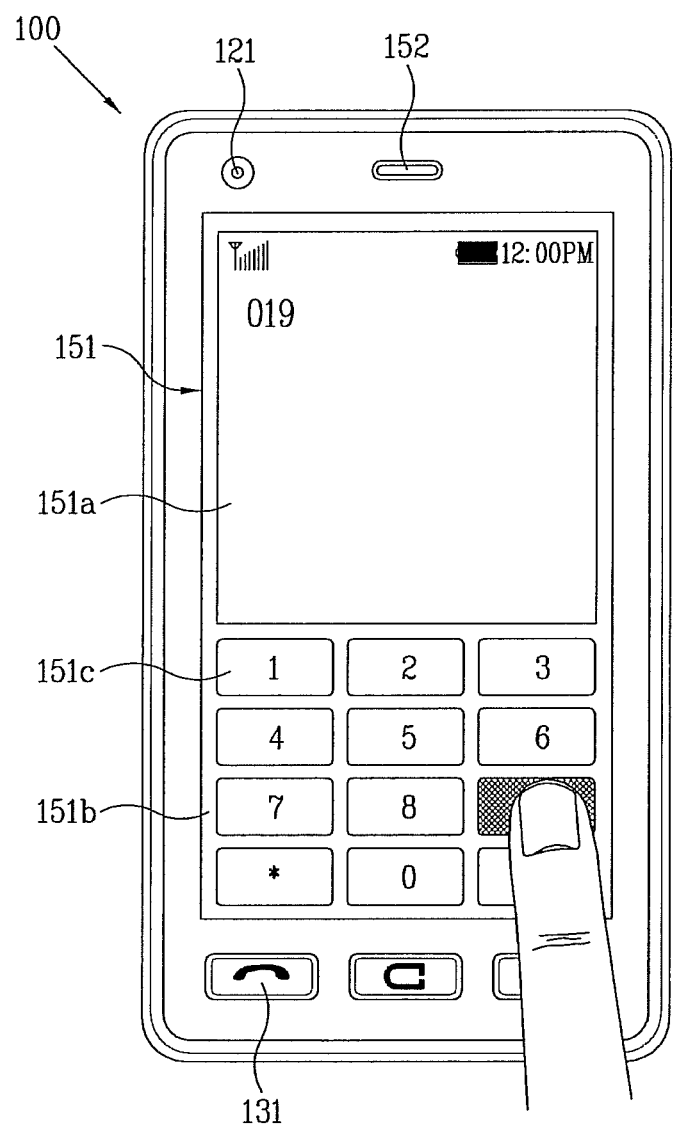

FIGS. 2A and 2B are front views of a terminal according to one embodiment as broadly described herein.

Various kinds of visual information may be displayed on the display 151. This information may be displayed in, for example, characters, numerals, symbols, graphics, icons and the like. In order to input the information, at least one of the characters, numerals, symbols, graphics and icons may be represented as a single predetermined array to be implemented in a keypad formation. This keypad formation may be referred to as 'soft keys'.

FIG. 2A shows that a touch applied to a soft key may be inputted through a front face of a terminal body. The display 151 may be operable through an entire area or may be divided into a plurality of regions. In the latter case, a plurality of regions may be interoperable. For instance, an output window 151a and an input window 151b may be displayed on the display 151. A soft key 151c representing a digit for inputting a phone number or the like may be outputted, or displayed on, the input window 151b. If the soft key 151c is touched, a digit corresponding to the touched soft key is outputted, or displayed on, the output window 151a. If a first manipulating device 131 of the input device 130 is manipulated, a call connection for the phone number displayed on the output window 151a may be attempted.

FIG. 2B shows that a touch applied to a soft key may be inputted through a rear face of a terminal body. FIG. 2A shows a case in which the terminal body is vertically arranged (portrait), and FIG. 2B shows a case in which the terminal body is horizontally arranged (landscape). The display 151 may change an output picture orientation according to the arranged direction or orientation of the terminal body.

In the arrangement shown in FIG. 2B, a text input mode is activated. An output window 151a' and an input window 151b' may be displayed on the display 151. A plurality of soft keys 151c' each representing at least one of characters, symbols and digits may be arranged in the input window 151b'. The soft keys 151c' may be arranged in a QWERTY key arrangement, or other arrangement as appropriate.

If the soft keys 151c' are touched through the touchpad 135, the characters, symbols and digits corresponding to the touched soft keys 151c' may be outputted, or displayed on, the output window 151a'. Thus, using a touch input via the touchpad 135, the soft keys 151c' may be prevented from being blocked by a finger in case of touch, compared to a touch input via the display 151. In a case in which the display 151 and the touchpad 135 are transparent, it may be possible to visually check fingers located at the backside of the terminal body. Hence, more correct touch inputs may be possible.

In certain embodiments, the display 151 or the touchpad 135 may receive a touch input by scroll. A user may scroll the display 151 or the touchpad 135 to shift a cursor or pointer located at a particular entity (e.g., a particular icon or the like) displayed on the display 151. In a case in which a finger or other pointing implement is shifted on the display 151 or the touchpad 135, a path of the shifted pointing implement may be visually displayed on the display 151. This may be useful in editing an image displayed on the display 151 or other application.

When both the display (touchscreen) 151 and the touchpad 135 are touched together within a predetermined time range, one function of the terminal 100 may be executed. The above case of the simultaneous touch may correspond to a case in which the terminal body is held by a user using a thumb and a first finger (clamping). The above function may include, for example, activation or deactivation for the display 151 or the touchpad 135.

Figure 3:
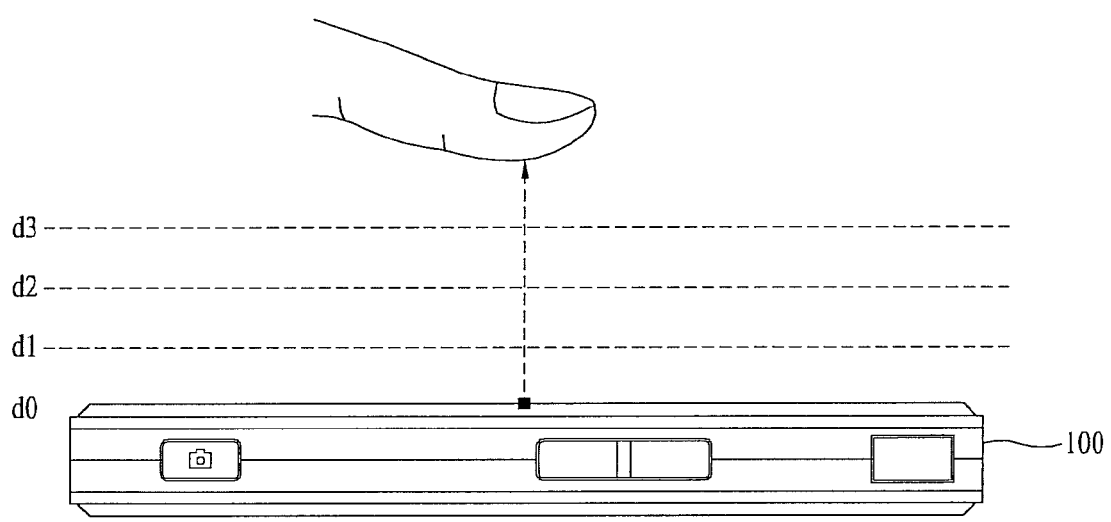
FIG. 3 illustrates a concept of proximity depth detected by a proximity sensor.

Referring to FIG. 3, when a pointing implement such as, for example, a user's finger, a stylus, a pen and the like approaches the touchscreen, the proximity sensor 141 provided within or in the vicinity of the touchscreen detects the approach of the pointer and then outputs a proximity signal. The proximity sensor 141 may output a different proximity signal based on a distance between the pointer and the proximity-touched touchscreen (this distance hereinafter referred to as 'proximity depth'). An exemplary cross-section of the touchscreen provided with a proximity sensor capable to three proximity depths is shown in FIG. 3. It is understood that a proximity sensor capable of proximity depths less than 3 or greater than or equal to 4 is possible.

If the pointer makes full contact with the touchscreen (d0), it is recognized as a contact touch. If the pointer is spaced apart from the touchscreen at a distance less than d1, it is recognized as a proximity touch to a first proximity depth. If the pointer is spaced apart from the touchscreen at a distance between d1 and d2, it is recognized as a proximity touch to a second proximity depth. If the pointer is spaced apart from the touchscreen at a distance less than d3 and greater than or equal to d2, it is recognized as a proximity touch to a third proximity depth. If the pointer is spaced apart from the touchscreen at a distance greater than or equal to d3, it is recognized as a proximity touch that has been released.

Hence, the controller 180 may recognize the proximity touch as one of various input signals according to the proximity depth and position of the pointer, and may perform various operation controls according to the various input signals.

Figure 4:
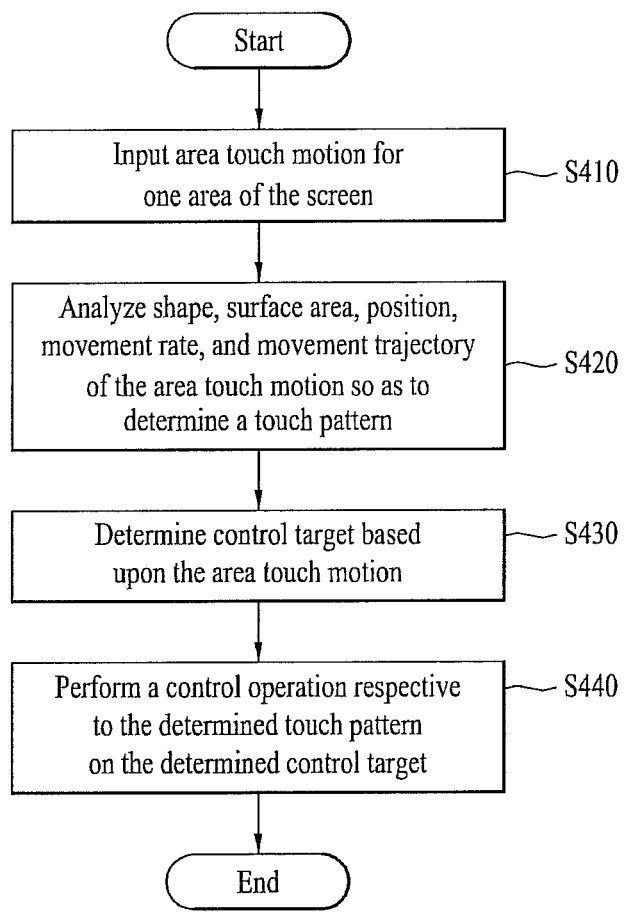
FIG. 4 is a flow chart of a method for controlling a display as embodied and broadly described herein.

FIG. 4 is a flow chart of a method for controlling a display as embodied and broadly described herein.

First, the touchscreen/display 151 receives an area touch corresponding to one region of the screen (S410). The controller 180 analyzes a touch position, a touch shape, a touch extent (or surface area), a touch time (or duration), a movement rate, and a movement trajectory of the area touch motion, and then the controller 180 determines a touch pattern corresponding to the received area touch motion (S420). Subsequently, the controller 180 determines a control target through the area touch motion (S430). Thereafter, the controller 180 performs the control operation corresponding to the determined touch pattern on the determined control target (S440).

The method shown in FIG. 4 will now be described with reference to FIGS. 5 to 13.

First, the touchscreen 151 receives an area touch corresponding to one region of the screen (S410).

The term "Area Touch" method as described herein refers to a method that recognizes a touched area as an input when a corresponding area within the touchscreen 151 is touched. Hereinafter, in order to describe the touch method in detail, a point touch method and an area touch method will first be respectively described in detail.

Figure 5A:
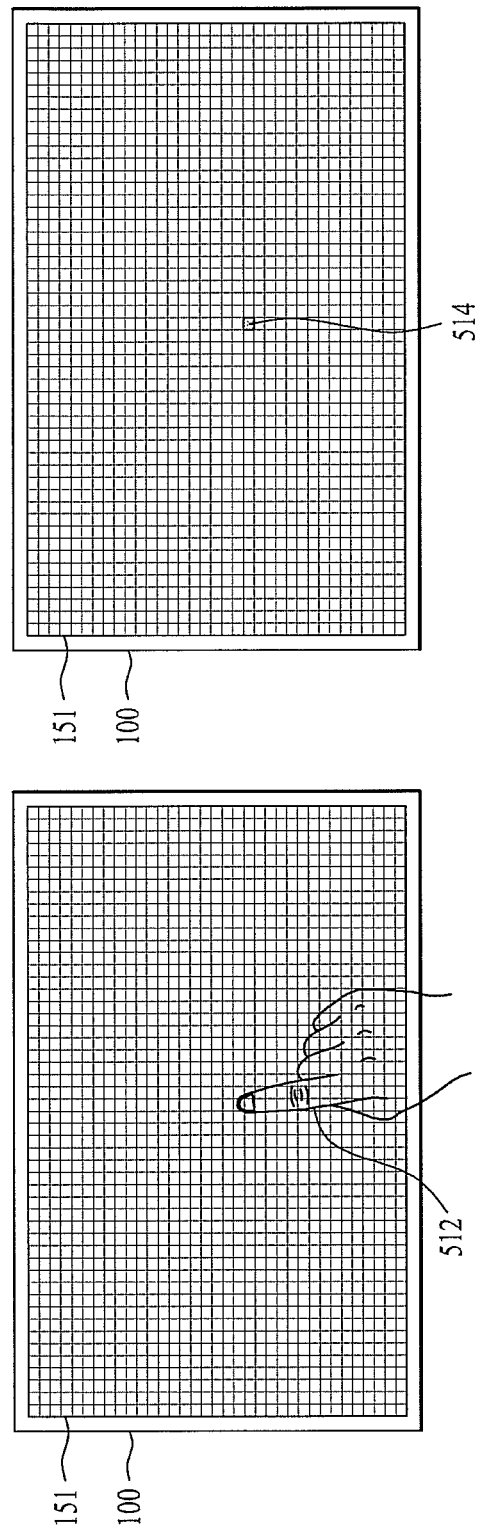
FIGS. 5A and 5B illustrate a point touch method and an area touch method according to an embodiment as broadly described herein.

FIG. 5A illustrates an example of the point touch method.

The point touch method refers to a touch method in which a specific point is selected within the touchscreen 151. The touchscreen 151 calculates the position of the touch point received from the user. The controller 180 analyzes the position corresponding to the calculated touch point, and then the controller 180 determines whether or not a menu or command belonging to the corresponding position exists within the touchscreen 151. Accordingly, when it is determined that a menu or command belonging to the corresponding position exists within the touchscreen 151, the controller 180 recognizes the received touch as a selection of the corresponding menu or command. More specifically, the touch point method selects a specific point by touching the corresponding point, thereby performing a control operation on the respective area including the corresponding point.

Referring to FIG. 5A, when a specific point 512 is selected by a point touch method using, for example, a hand/finger motion/contact, the touchscreen 151 recognizes the received motion/contact as a selection point 514 being selected by the user. Accordingly, the controller 180 may activate the menu or perform the command corresponding to the selection point 514.

Figure 5B:
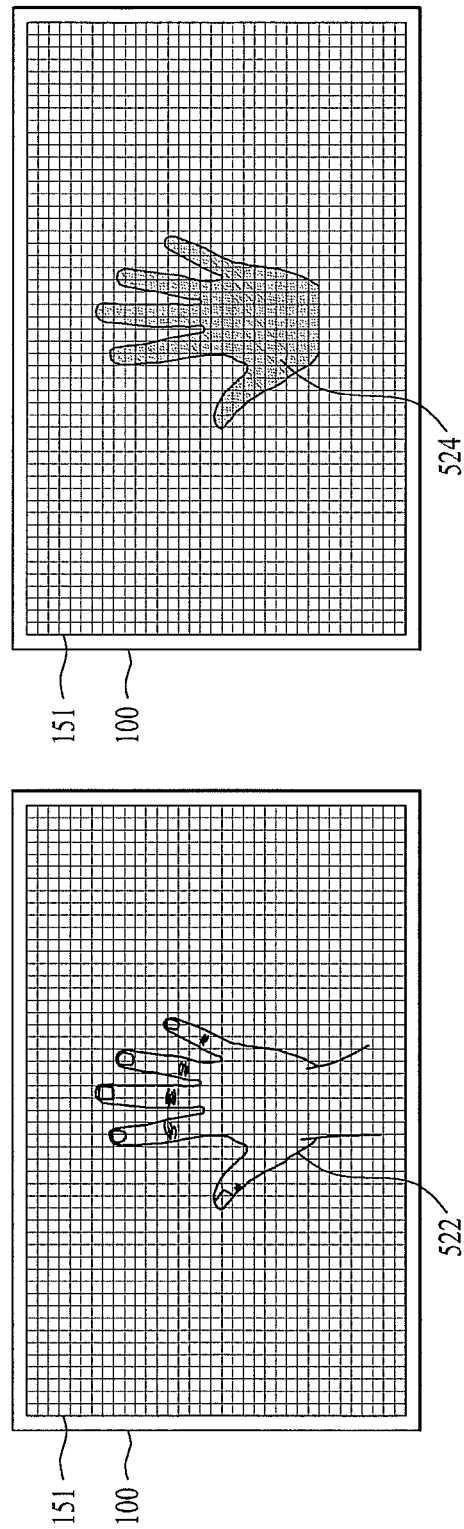

FIG. 5B illustrates an example of the area touch method.

The area touch method corresponds to a method of touching an area having a specific surface area (or extent) and a specific shape. When, for example, a finger or hand touches the touchscreen 151, the portion of the touchscreen 151 that comes in contact with the finger or hand has a specific surface area or shape. In the point touch method, even if the entire finger or hand touches the touchscreen 151, the touchscreen 151 does not determine the touch of the finger or hand as the touch of the entire touched area. Instead, in the point touch method, the touchscreen 151 recognizes the touch of the finger as a touch of a specific point within the selection area.

In the area touch method, the touchscreen 151 may recognize the touch of the finger or hand as the touch of the entire selection area.

Referring to FIG. 5B, when, for example, a palm 522 of the user touches the touchscreen 151, the touchscreen 151 recognizes the entire area 524 touched by the palm 522 of the user as the touch input.

When the touchscreen 151 is touched by the area touch method, the touchscreen 151 uses any one of the position of the touched area, the shape of the touched area, the surface area (or extent) of the touched area, the time (or duration) of the touch motion, the speed (or movement rate) of the touch motion, and the movement trajectory of the touch motion, so as to acquire diverse touch inputs.

Subsequently, when an area touch motion is received, the controller 180 analyzes the touch position, the touch shape, the touch extent (or surface area), the touch time (or duration), the movement rate (or speed), and the movement trajectory of the area touch motion, and then the controller 180 determines a touch pattern corresponding to the received area touch motion (S420).

The memory 160 of the mobile terminal 100 may store a plurality of predetermined touch patterns. Such touch patterns may be patterns realized (or configured) by hand motions performed on the touchscreen 151 by a human being. For example, the motion of making a fist has a pattern of making a fist from a hand (or palm) that is wide open. When such motion of making a fist is performed on the touchscreen 151 as the area touch motion, the touchscreen 151 receives a touch pattern corresponding to the motion of making a fist. The touch patterns corresponding to such a variety of hand motions may be stored in the memory 160 as predetermined touch patterns.

The controller 180 determines whether or not the determined touch pattern matches with a touch pattern stored in the memory 160. In a case in which two patterns are determined as matching patterns, the controller 180 may perform a control operation corresponding to the determined touch pattern (refer to step S440).

Hereinafter, hand motions and predetermined touch patterns realized by respective hand motions on the touchscreen 151 will be described in detail.

A particular hand motion may include a plurality of meanings. For example, a motion of slicing the surface with a hand knife (or blade) may signify a motion of cutting or slicing an object. A motion (or action) of making a fist may signify crumpling an object or combining two or more objects. A motion of making a stamp with the fist may signify moving an object (or shifting the position of an object). And, a motion of pushing the palm of the hand to one direction may also signify moving an object (or shifting the position of an object). However, the significance of the above-described specific hand motions is merely exemplary, and specific hand motions may have other meanings without being limited to the examples provided herein.

In a case in which such touch motions are realized in the touchscreen 151, and when the touch motions being inputted as area touch motions respectively configure a constant touch pattern, such touch patterns may be pre-stored in the memory 160. More specifically, various touch patterns corresponding to each hand motion may be pre-stored in the memory 160. Additionally, the memory 160 may also pre-store control operations corresponding to each touch pattern.

Touch patterns of the above-described hand motions will now be described in detail according to various embodiments.

FIGS. 6A to 6E illustrate exemplary hand motions and corresponding area touches within the touchscreen.

Figure 6A:
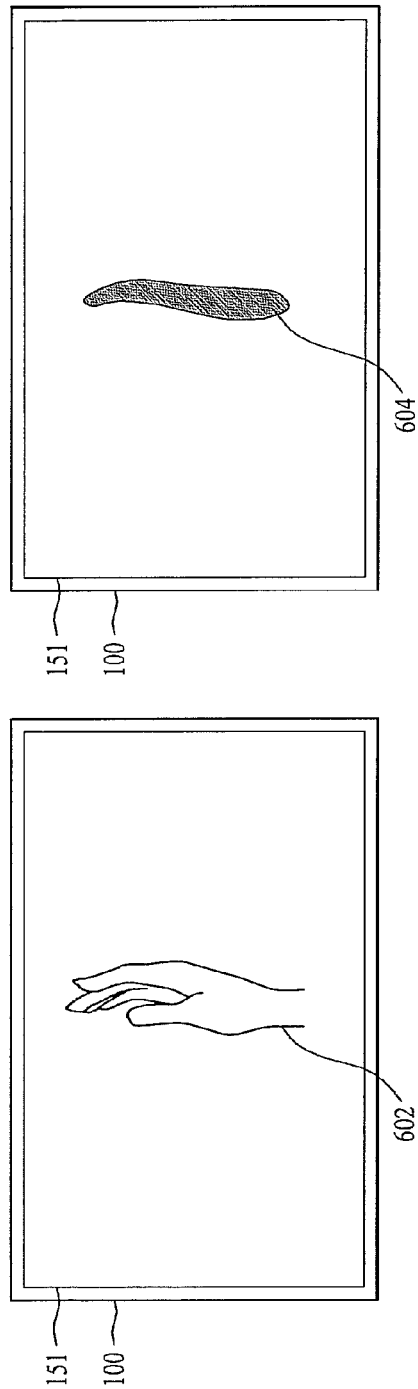
Figure 6A:
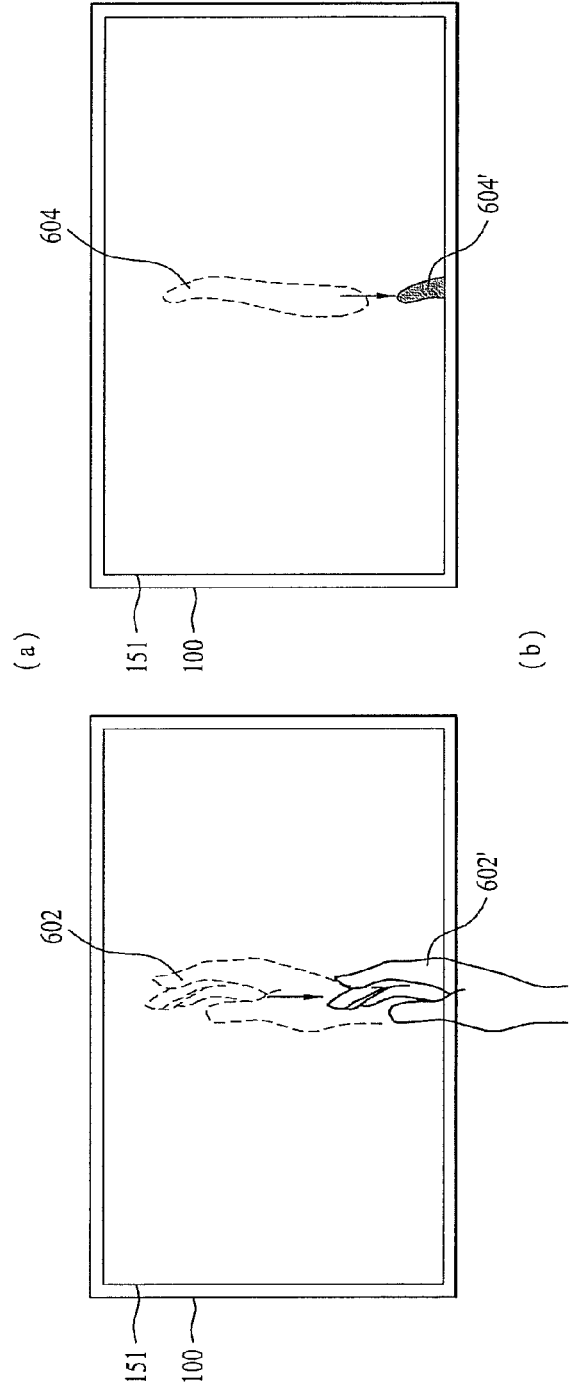

FIG. 6A illustrates a first exemplary hand motion among a plurality of hand motions and a first touch pattern corresponding to the first hand motion. The first hand motion corresponds to a motion of touching the touchscreen 151 with the side of a user's hand so as to perform a hand blade (or knife) and then moving (or sliding) the hand knife downwards. This hand motion generally signifies an action of slicing (or cutting) an object, an action of dividing (or splitting) an object, an action of generating an object, and so on. Although the hand knife is shown moving (or sliding) downwards in FIG. 6A, this is merely exemplary, and thus not limited only to the example presented in FIG. 6A. For example, the hand knife may also move (or slide) upwards, or may be formed and moved horizontally.

FIG. 6A(a) shows an initial hand formation 602, when the touchscreen 151 is initially touched by the hand blade, and a first area touch 604 being inputted to the touchscreen 151 when the touchscreen 151 is touched by the hand blade. FIG. 6A(b) shows a motion of moving (or sliding) the hand downwards while maintaining the hand blade formation. More specifically, FIG. 6A(b) shows a final hand formation 602', which corresponds to the initial hand formation 602 that has moved (or slid) downwards. The touchscreen 151 recognizes the area touch as being moved from the first area touch 604 in FIG. 6A(a) to the second area touch 604' in FIG. 6A(b). When an area touch is performed on the touchscreen 151 by using the pattern shown in FIG. 6A, the touchscreen 151 recognizes the inputted touch motion as the touch motion corresponding to the first touch pattern.

Figure 6B:
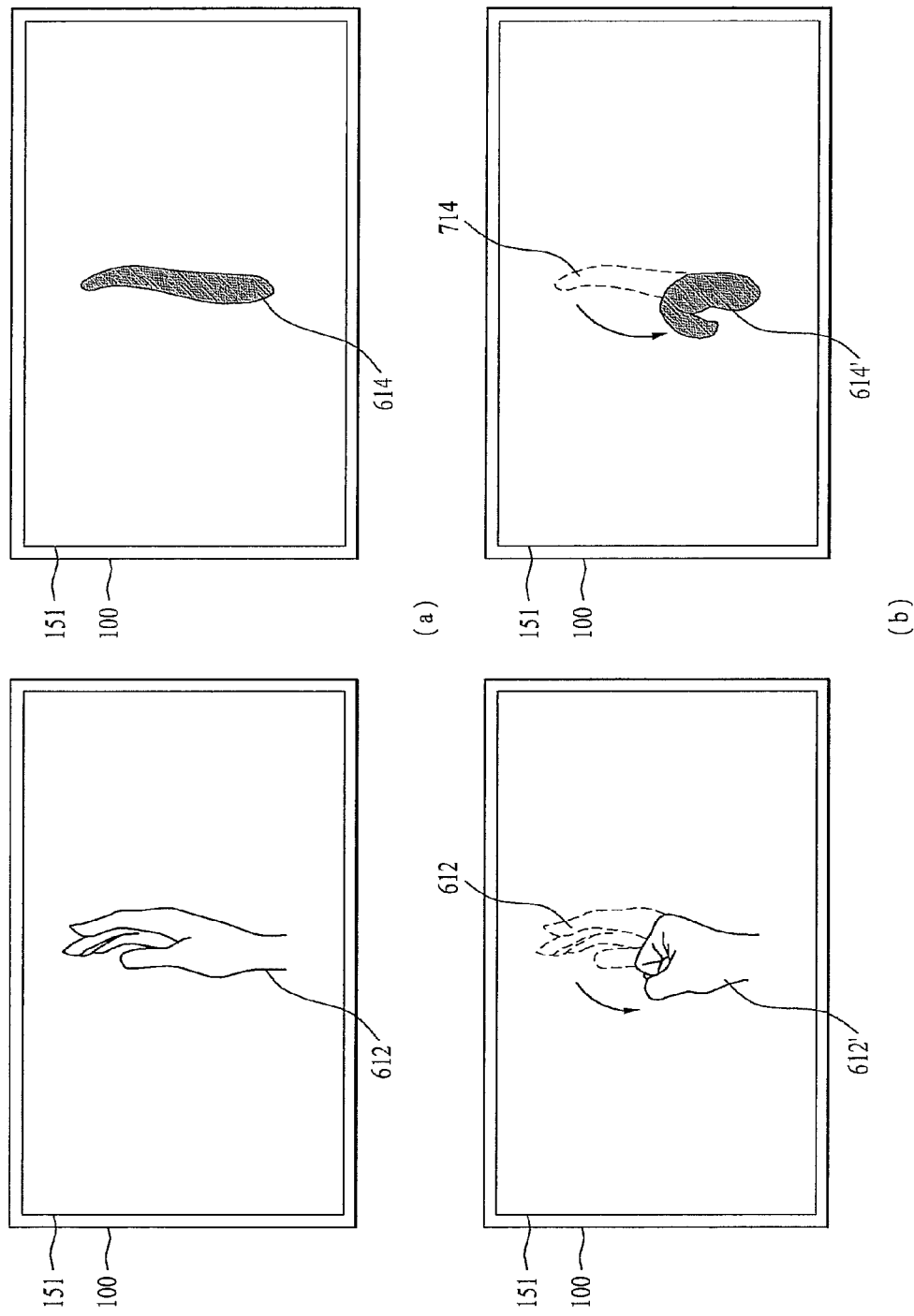

FIG. 6B illustrates a second exemplary hand motion and a second touch pattern corresponding to the second hand motion. The second hand motion corresponds to a motion of folding the palm (or squeezing the hand). This hand motion generally signifies an action of grabbing an object, an action of crumbling an object, an action of reducing the size of an object, and so on.

FIG. 6B(a) shows an initial hand formation 612 and a corresponding first area touch 614, wherein the corresponding hand formation is being recognized by the touchscreen 151. The touchscreen 151 may recognize this hand motion as an open palm formation immediately preceding the motion of folding the palm (or making a fist).

FIG. 6B(b) shows a hand formation of folding the palm (or making a fist) 612' and a corresponding second area touch 614', wherein the corresponding hand formation is being recognized by the touchscreen 151. When the hand formation is changed from an open palm formation 612 to a folded palm formation 612', the touchscreen 151 may recognize the corresponding hand motion, which shifts the first area touch 614 to the second area touch 614', as the second touch pattern. When an area touch is performed on the touchscreen 151 by using the pattern shown in FIG. 6B, the touchscreen 151 recognizes the inputted touch motion as the touch motion corresponding to the second touch pattern. In this case, the touchscreen 151 may perform the control operation corresponding to the second touch pattern, which is stored in the memory 160. The corresponding operation will be described later, with reference to FIG. 9.

FIG. 6C illustrates a third exemplary hand motion and a third touch pattern corresponding to the third hand motion. The third hand motion corresponds to a motion of unfolding (or opening) the hand from a state where the hand is folded (or fisted). Generally, this hand motion may signify an action of spreading an object wide open, an action of enlarging an object, and so on.

FIG. 6C(a) shows an initial hand formation 622 and a corresponding first area touch 624, wherein the corresponding hand formation is recognized by the touchscreen 151. The touchscreen 151 may recognize this hand motion as a folded (or fisted) palm formation immediately preceding the motion of opening (or unfolding) the palm. FIG. 6C(b) shows a hand formation of opening (or unfolding) the palm 622' and a corresponding second area touch 624', wherein the corresponding hand formation is recognized by the touchscreen 151. When the hand formation is changed from a folded palm formation 622 to an open palm formation 622', the touchscreen 151 may recognize the corresponding hand motion, which shifts the first area touch 624 to the second area touch 624', as the third touch pattern. When the touchscreen 151 recognizes the inputted touch motion corresponding to the third touch pattern, the controller 180 may perform the control operation corresponding to the third touch pattern.

FIG. 6D illustrates a fourth exemplary hand motion and a fourth touch pattern corresponding to the fourth hand motion. The fourth hand motion corresponds to a hand motion having an open palm formation moving the open (or unfolded) palm in a horizontal direction. This hand motion generally signifies an action of moving an object (or changing the position of an object), an action of generating an object, and so on.

FIG. 6D(a) shows an initial hand formation 632 and a corresponding first area touch 634, wherein the corresponding hand formation is recognized by the touchscreen 151. The touchscreen 151 may recognize this hand motion as an open (or unfolded) palm formation immediately preceding the motion of moving the open (or unfolded) palm horizontally. FIG. 6D(b) shows a hand formation of shifting the position of the hand 632' and a corresponding second area touch 634', wherein the corresponding hand formation is recognized by the touchscreen 151. When the hand formation positioned in a middle area of the touchscreen 151 is changed to a hand formation 632' shifted rightwards, the touchscreen 151 may recognize the corresponding hand motion, which shifts the first area touch 634 to the second area touch 634', as the fourth touch pattern. When an area touch is performed on the touchscreen 151 by using the pattern shown in FIG. 6D, the touchscreen 151 recognizes the inputted touch motion as the touch motion corresponding to the fourth touch pattern. In this case, the controller 180 may perform the control operation corresponding to the fourth touch pattern, which is stored in the memory 160. The corresponding operation will be described later with reference to FIGS. 10A to 10F.

Figure 6E:
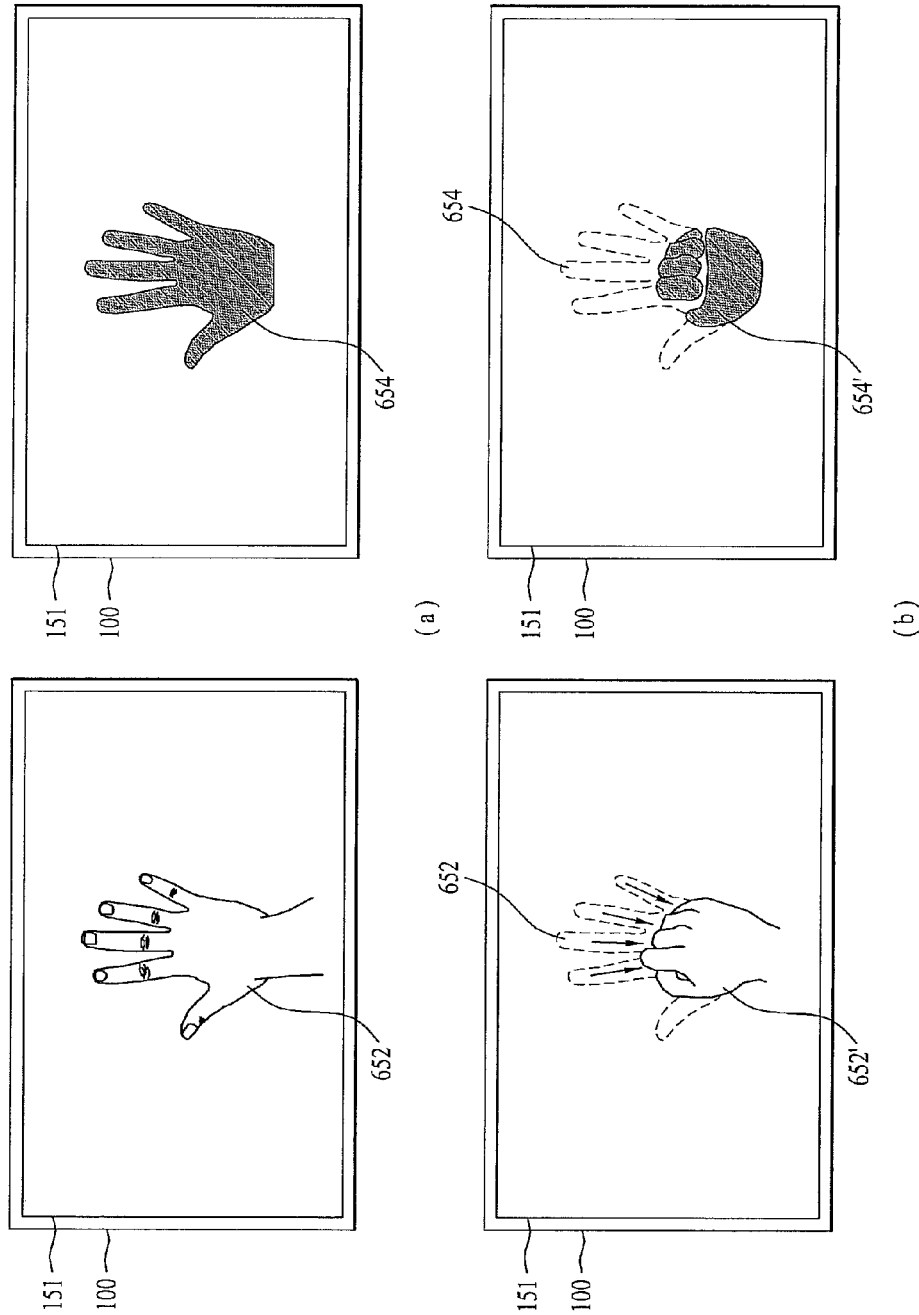

FIG. 6E illustrates a fifth exemplary hand motion and a fifth touch pattern corresponding to the fifth hand motion. The fifth hand motion corresponds to a hand motion of touching the touchscreen 151 and then making a first. This hand motion generally signifies an action of fixing an object, an action of adhering an object to the hand or grasping an object (i.e., similar to an action of making a photocopy), and so on.

FIG. 6E(a) shows an initial hand formation 652 and a corresponding first area touch 654, wherein the corresponding hand formation is recognized by the touchscreen 151. The first area touch 654 corresponds to an area being touched by a flat, open palm. FIG. 6E(b) shows a hand formation of making a fist. FIG. 6E(b) corresponds to a formation in which a portion of the first area touch 654 disappears from touchscreen 151 as the fist is made. Once the first area touch 654 is touched on the touchscreen 151, and then at least partially disappears from the touchscreen 151 after a predetermined period of time, the touchscreen 151 may recognize this touch formation as the fifth touch pattern. As described above, when an area touch is performed on the touchscreen 151 by using the pattern shown in FIG. 6E, the touchscreen 151 recognizes the inputted touch motion as the touch motion corresponding to the fifth touch pattern. In this case, the controller 180 may perform the control operation corresponding to the fifth touch pattern, which is stored in the memory 160. The corresponding operation will be described later with reference to FIGS. 11A to 11D.

The first to fifth touch patterns described with reference to FIGS. 6A to 6E are merely exemplary, and embodiments are not limited only to the examples presented herein. More specifically, various hand patterns corresponding to a variety of other hand motions that are not presented in detail herein may also be adopted as touch patterns without limitation in formation or type. For example, a wide range of touch patterns including a motion of waving the hand, a motion of turning (or flipping) a page, a motion of rubbing the screen with a finger, and other motions as appropriate may correspond to touch patterns as embodied and broadly described herein.

The above-described touch patterns correspond to touch patterns that are realized by hand motions being performed on a touchscreen. Accordingly, a difference may occur in the touch patterns depending upon the hand of a particular user. For example, a difference may occur in the touch pattern based on differences in the size of the hands of various users or on differences in the shape of the various user's hands. Therefore, with respect to predetermined touch patterns, the memory 160 may also store patterns of hand motions made by each individual user. For example, various user-specific elements, such as the thickness of the hand, the length of the fingers, the positions of each finger joint, and so on, may also be stored in advance in the memory 160.

In the description of FIGS. 6A to 6E, the description of each hand motion and the corresponding touch pattern was made with respect to the right hand, simply for ease of illustration and discussion. However, depending upon the settings made by the user or the manufacturer, hand motions performed by the left hand may also be recognized as touch patterns by the touch screen 151. Furthermore, the settings may also be made so that the touchscreen 151 can recognize hand motions performed by both the left hand and the right hand of the user.

Referring back to FIG. 4, after inputting the area touch motion (S410) and analyzing the area touch motion to determine a touch pattern (S420), the controller 180 determines a control target based on the area touch motion (S430).

A mobile terminal as embodied and broadly described herein may determine a touch pattern corresponding to an area touch motion and may perform a control operation corresponding to the determined touch pattern. Thus, a control target, which corresponds to an object that is to perform the control operation, may be determined based on the area touch motion.

The control target may correspond to diverse content provided in the touchscreen 151. For example, the control target may include icons, thumbnail images, file images, application execution windows, and so on. Additionally, the icons, thumbnail images, file images, or applications or files that are displayed by execution windows may also be controlled by the control operation. For example, if a control operation corresponding to a determined touch pattern corresponds to a storing (or saving) operation, when it is assumed that the touchscreen receives a touch pattern corresponding to a storing operation for an execution window of a word processor, in addition to controlling the execution window of the corresponding word processor, the controller 180 may perform a control operation enabling a file of the current word processor, which is displayed by the execution window, to be stored (or saved).

Figure 7A:
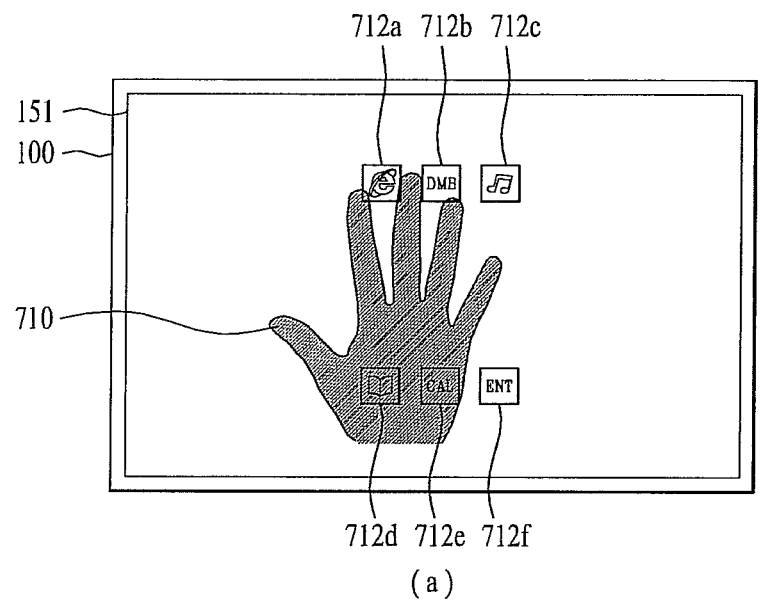
FIGS. 7A and 7B illustrate exemplary operations of determining a control target based upon an area touch motion according to an embodiment as broadly described herein.
Figure 7A:
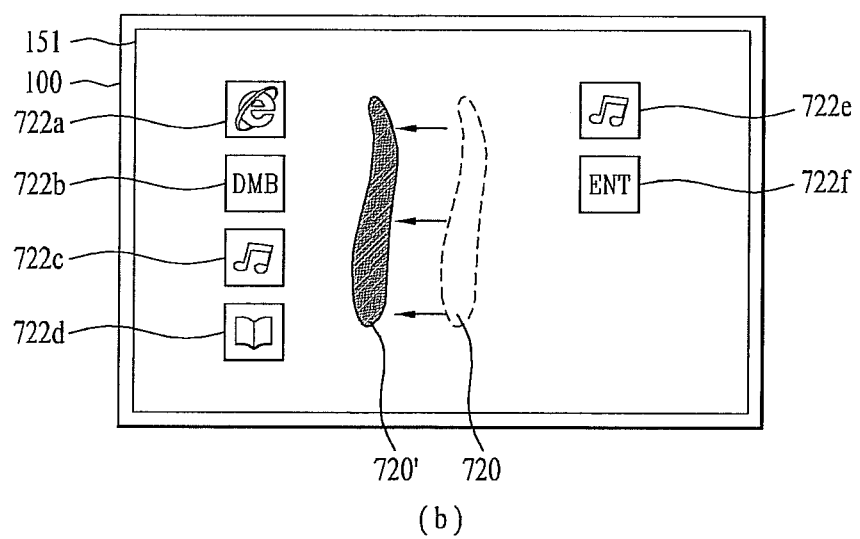
Figure 7B:
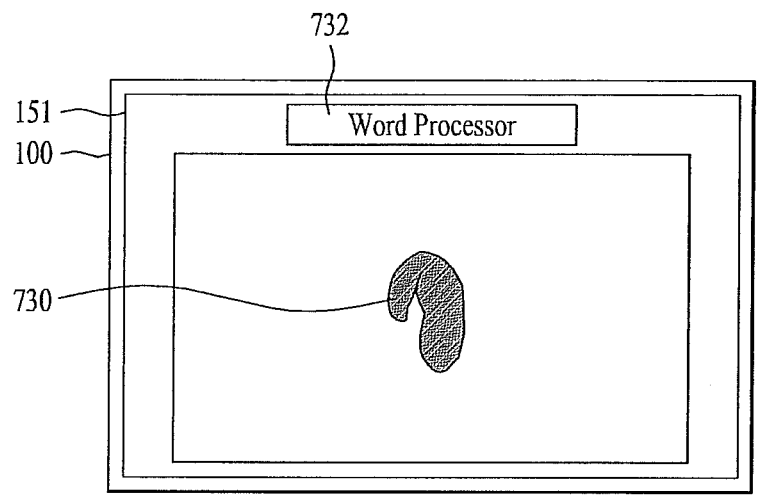
Figure 7B:
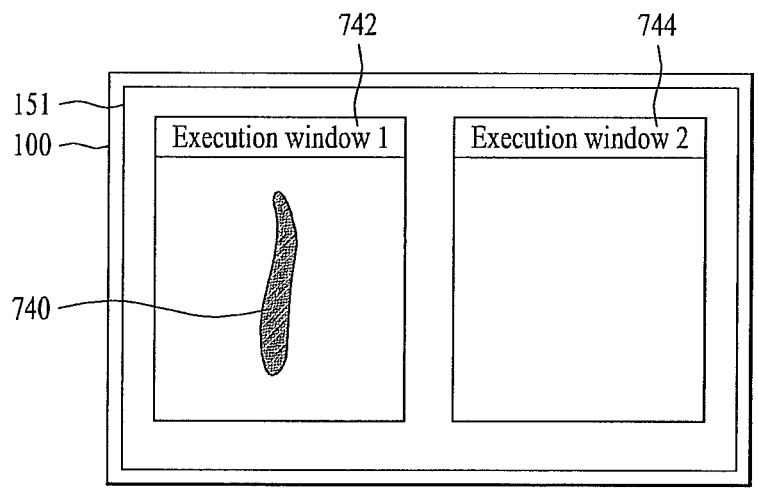

FIGS. 7A and 7B illustrate exemplary operations of determining a control target based upon the area touch motion in a mobile terminal as embodied and broadly described herein.

FIG. 7A illustrates an exemplary operation of selecting specific content using an area touch motion when a plurality of different content items (icons) is displayed on the touchscreen 151. An area touched by the area touch method may have a consistent shape and surface area such that, when a plurality of content items (icons) is displayed on the touchscreen 151, it may be necessary to determine which content, from among the plurality of content items, is being selected as the control target by the area touch motion.

Referring to FIG. 7A(a), the touchscreen 151 may display a plurality of icons 712a to 712f. The touchscreen 151 receives an area touch motion performed by the user, and an area touch 710 corresponding to the received area touch motion is displayed on the touch screen 151.

Subsequently, depending upon whether or not the area touch 710 includes a display area of the icons 712a to 712f, the controller 180 may determine a specific icon among the corresponding icons to be the control target. The standard for selecting the icons may vary depending upon the extent of the display area of each icon 712a to 712f included in the area touch 710. If settings are established so that specific icons may be selected as the control targets only when the area touch 710 completely (or fully) includes the corresponding icons, the controller 180 may determine only the specific icons 712d and 712e to be the control targets. Alternatively, if settings are established so that specific icons can be selected as the control targets when the area touch 710 includes even just a portion of the corresponding icons, the controller 180 may determine the icons 712d and 712e, which are fully included in the area touch 710, as well as the icons 712a and 712b, which are only partially included in the area touch 710, to be the control targets. Moreover, if settings are established so that specific icons included in the area touch 710 or near the area touch 710 may be selected as the control targets, the controller 180 may determine all of the icons 712a to 712f to be the control targets.

As described above, by using a wide range of set-up methods, the controller 180 may select one or more content items as the control target(s) based upon whether or not the area touch includes the display area of each content item (or icon).

FIG. 7A(b) illustrates an exemplary operation of selecting a control target based upon the movement trajectory of the area touch. In FIG. 7A(b), among the diverse touch patterns presented herein, the fourth touch pattern 720 and 720' will be illustrated for simplicity and ease of discussion/illustration.

The touchscreen 151 displays a plurality of icons 722a to 722d. In movement of the area touch 720 to 720' according to the fourth touch pattern as shown, the plurality of icons 722a to 722f is not included at all in the area touches 720 and 720'. However, some of the icons 722a to 722d are positioned within the direction of the movement trajectory of the area touch corresponding to the fourth touch pattern. Accordingly, the controller 180 may determine the movement trajectory of the area touch based upon predetermined settings, so as to input settings enabling the touchscreen 151 to determine the control target based upon the direction and distance of the movement trajectory of the area touch. Therefore, referring to FIG. 7A(b), among the plurality of icons 722a to 722f displayed on the touchscreen 151, specific icons 722a to 722d may be determined as being positioned within the movement direction of the area touch. Thus, the controller 180 may determine the corresponding icons 722a to 722d to be the control targets.

As described above, when a plurality of content items is displayed on the touchscreen 151, the controller 180 may analyze the corresponding area touch motion so as to select one or more specific content items, among the plurality of content items displayed on the touchscreen 151, to be the control targets.

FIG. 7B illustrates an exemplary operation of receiving an area touch motion when an execution window of a specific application is being displayed on the touchscreen 151.

The mobile terminal 100 may execute a specific application, and the touchscreen 151 may display an execution window of the specific application. While the execution window is being displayed, the touchscreen 151 may receive an area touch motion.

In the example shown in FIG. 7B(a), a word processor application is executed as the specific application, and the touchscreen 151 displays an execution window 732 through which the word processor is executed. The touchscreen 151 receives an area touch 730 touched by an area touch motion. The area touch 730 corresponds to an area included in the execution window 732, and the controller 180 may determine the execution window 732 to be the control target. Also, the controller 180 may consider the word processor itself, which is the application corresponding to the execution window 732, to be the control target. For example, when the controller 180 determines the word processor to be the control target, and when the control operation corresponds to a compression operation, the controller 180 may also perform the operation of compressing the corresponding application.

As shown in FIG. 7B(b), two execution windows 742 and 744 are displayed on the touchscreen 151 as the execution window of a current application. The touchscreen 151 receives an area touch 740 touched by an area touch motion. The area touch 740 corresponds to an area included in a first execution window 742, and the controller 180 may determine the first execution window 742, among the two execution windows 742 and 744, to be the control target. Similarly, as described in FIG. 7B(a), the controller 180 may consider the application corresponding to the first execution window 742, which is the determined control target, as the control target, thereby performing the control operation of the corresponding application.

Referring once again to FIG. 4, the controller 180 performs the control operation corresponding to the determined touch pattern on the determined control target (S440).

Hereinafter, an example of performing a control operation with respect to a determined touch pattern according to an embodiment will now be described in detail with reference to FIGS. 8A to 11B.

With respect to the display control operation according to the touch pattern, the memory 160 may store touch patterns corresponding to each hand motion in advance. The memory 160 may also store in advance multiple display control operations corresponding to each of the pre-stored touch patterns. For example, the memory 160 may store the area touch motion corresponding to the motion of cutting (or slicing) an object with a hand blade (or knife) as the first touch pattern. And, the memory 160 may also store in advance an operation of dividing the display area of the content item(s), an operation of deleting one or more content item(s), an operation of generating a new window, and so on, as the display control operations corresponding to the first touch pattern. Furthermore, the display control operations corresponding to each touch pattern may consist of a single display control operation or may consist of a combination of multiple display control operations.

FIGS. 8A to 8E illustrate a display control operation corresponding to a first touch pattern.

The first touch pattern corresponds to a pattern that is indicated by a hand motion of cutting (or slicing) an object while touching the touchscreen 151. Accordingly, in a case in which an area of the touchscreen 151 is touched (i.e., touched by the area touch method) by the first touch pattern, the controller 180 may perform a pre-stored control operation corresponding to the first touch pattern. The control operation corresponding to each touch pattern may be designated by the user or may be optionally and randomly selected by the mobile terminal 100.

The control operation performed by the mobile terminal 100 when the mobile terminal receives the first touch pattern may perform a role similar to the meaning implied (or intended) by the actual inputted hand motion. More specifically, since the hand motion for generating the first touch pattern includes the cutting (or slicing) action, the control operation corresponding to the first touch pattern may include an operation of dividing the area including the currently displayed content, an operation of deleting specific content, and so on. Also, in a case in which the execution window of an application is displayed on the touchscreen 151, the control operation corresponding to the first touch pattern may include an operation of dividing the execution screen (or window) of the corresponding application, an operation of generating a new display window, and so on. However, in addition to the above-described control operations, control operations performing the functions similar to the meaning implied (or intended) by the inputted hand motions may also be included in the control operation corresponding to the first touch pattern.

Figure 8A:
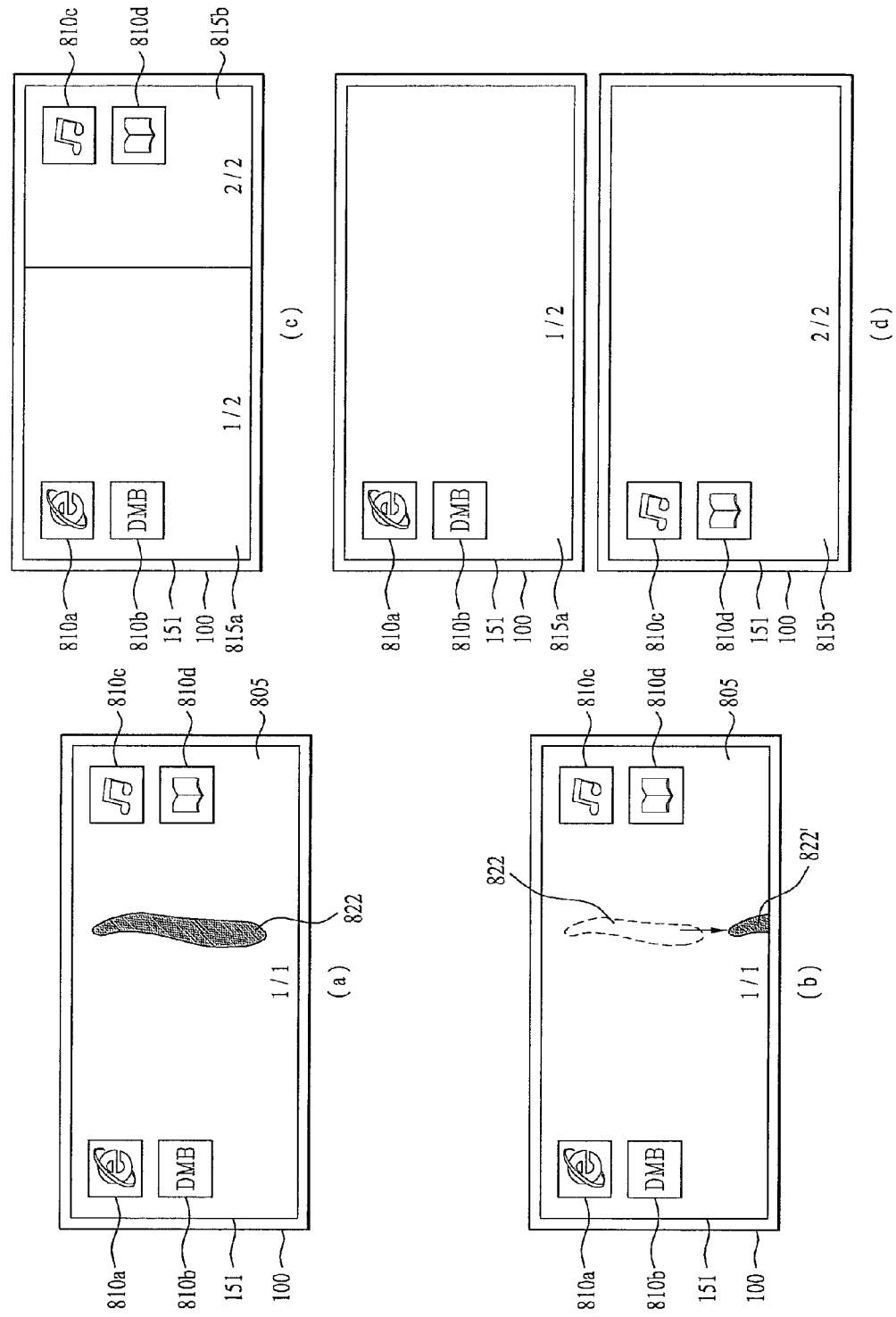
FIGS. 8A to 8E illustrate exemplary display control operations corresponding to a first touch pattern according to an embodiment as broadly described herein.

Referring to FIGS. 8A(a) and 8A(b), the touchscreen 151 displays at least one of multiple icons 810a to 810d on a display screen 805. The touchscreen 151 receives area touch motions 822 and 822' corresponding to the first touch pattern, and the controller 180 determines whether the inputted touch motions correspond to the pre-stored touch patterns. When the controller 180 determines the inputted touch motions as touch motions corresponding to the first touch pattern, the controller 180 determines the control target that is to be controlled, and then the controller 180 may perform the control operation corresponding to the first touch pattern on the control target.

FIG. 8A(c) illustrates an example of the display screen being divided in accordance with a control operation corresponding to the first touch pattern performed by the mobile terminal 100.

In implementing the control operation corresponding to the first touch pattern, the controller 180 may divide the screen on which the content is being displayed. When various content items, such as icons, are being displayed, the controller 180 may also divide the actual screen displaying the content.

Referring to FIG. 8A(c), in accordance with the movement trajectory of the first touch pattern, a constant line is marked on the display screen. Based upon the marked line, the display screen is divided into two different screens 815a and 815b. More specifically, as the touchscreen 151 is touched by the area touch method in accordance with the first touch pattern, a single screen 805 may be divided into two different screens 815a and 815b. As the initial screen 805 is divided into two new screens 815a and 815b, among the icons 810a to 810d that were displayed in the initial display screen 805, icons 810a and 810b are included in the first screen 815a, and icons 810c and 810d are included in the second screen 815b.

FIG. 8A(d) illustrates an example of the touchscreen 151 being displayed on a plurality of separate screens. That is, FIG. 8A(c) shows that the two screens 815a and 815b are simultaneously displayed on the touchscreen 151, while in FIG. 8A(d), the two screens 815a and 815b are individually (or separately) displayed on the touchscreen 151. Accordingly, based upon the trajectory along which the first touch pattern is moved, the icons 810a and 810b that are positioned on the left side are included in one screen (i.e., the first screen) 815a, and the icons 810c and 810d that are positioned on the right side are included in the other screen (i.e., the second screen) 815b. Thus, the display screen of the touchscreen 151 is divided.

Figure 8B:
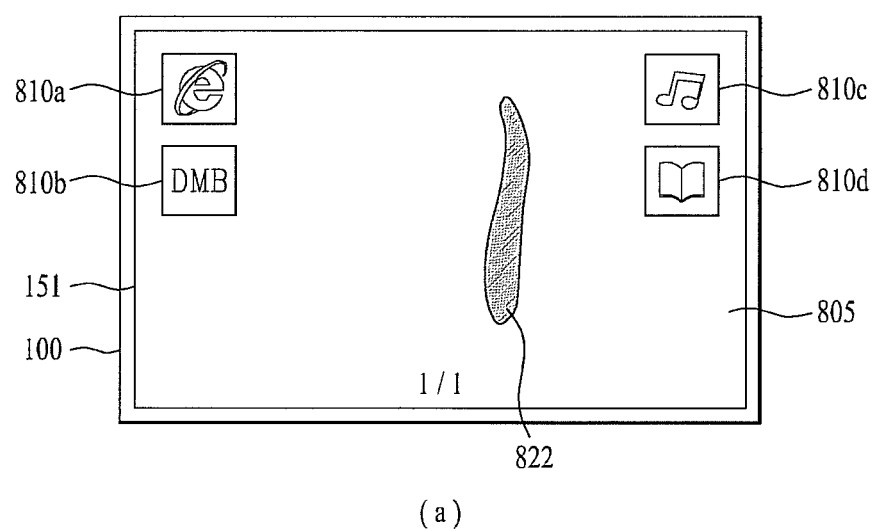
Figure 8B:
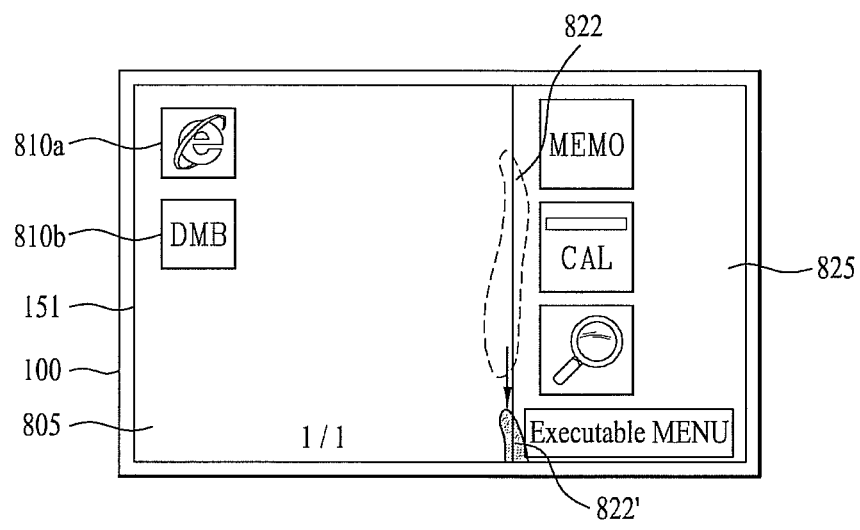

FIG. 8B illustrates another example of a control operation being performed with respect to the first touch pattern. As another example of a control operation corresponding to the first touch pattern, the controller 180 may also create (or generate) a new window in accordance with the movement trajectory of the area touch motion having the first touch pattern, and the mobile terminal may be controlled so that a new window may be created on either one of the right side or the left side of the touchscreen 151 (in a case in which the movement trajectory corresponds to a vertical trajectory dividing the display screen into a left screen and a right screen as shown in FIG. 8B). Alternatively, a new window may be created on either one of the upper side or the lower side of the touchscreen 151 (in a case in which the movement trajectory corresponds to a horizontal trajectory dividing the display screen into an upper screen and a lower screen).

Referring to FIG. 8B(a), the touchscreen 151 displays a plurality of icons 810a to 810d, and then the touchscreen 151 receives an area touch 822 touched by an area touch motion. Referring FIG. 8B(b), when the touchscreen 151 receives area touch motions 822 and 822' corresponding to the first touch pattern, the controller 180 may create a new window 825 in addition to the initial content display screen 805. More specifically, the new window 825 may be created as a control operation corresponding to the first touch pattern. The new window 825 may include one or more selection icons which may be displayed accordingly.

Figure 8C:
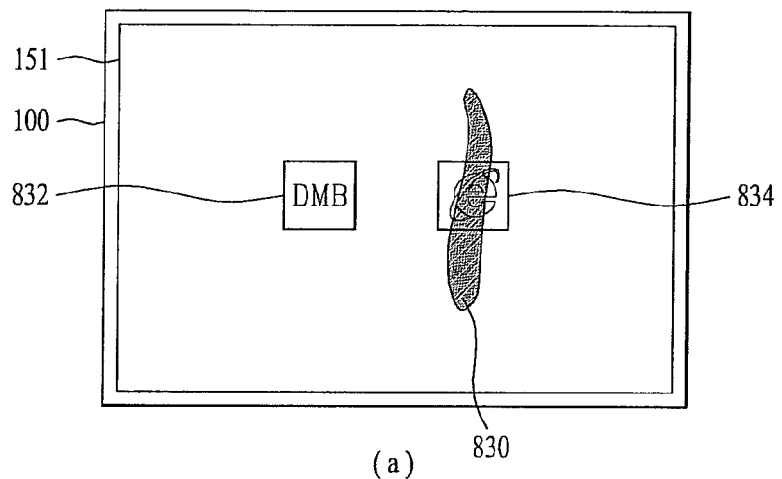
Figure 8C:
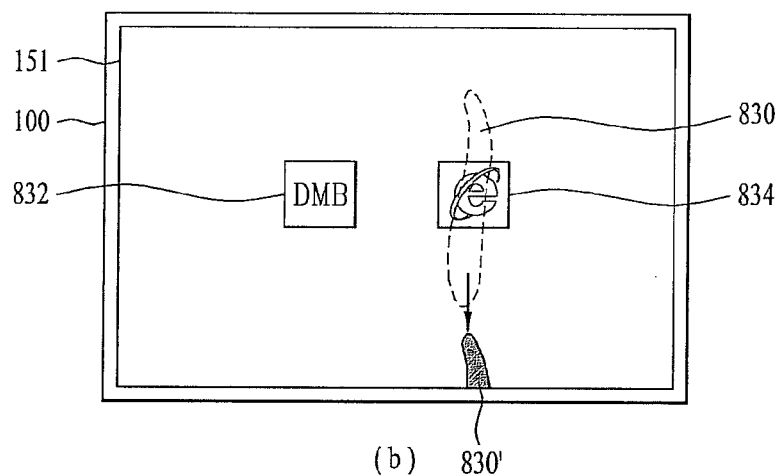
Figure 8C:
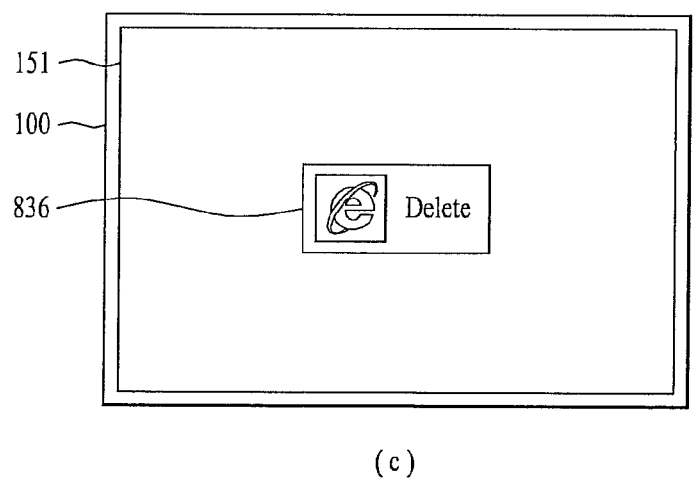

FIG. 8C illustrates another example of a control operation being performed with respect to the first touch pattern. As yet another example of a control operation corresponding to the first touch pattern, the controller 180 may also delete content. More specifically, in certain embodiments, content positioned within the movement trajectory along which the first touch pattern moves may be deleted.

Referring to FIGS. 8C(a) and 8C(b), the touchscreen 151 displays a plurality of icons 832 and 834, and then the touchscreen 151 may receive touch motions 830 and 830' corresponding to the first touch pattern, and corresponding to a specific icon 834 displayed on the touchscreen 151. Herein, the controller 180 may determine the specific icon 834 to be the control target. Referring to FIG. 8C(c), as a control operation corresponding to the first touch pattern, the controller 180 may delete the specific icon 834. When deleting an icon, the controller 180 may delete only one, or may delete more than one of the icons that are displayed. Alternatively, the controller 180 may delete actual applications from the memory 160 that are associated with the icons to be deleted. For example, as shown in FIG. 8C, when the internet icon 834 is deleted, the controller 180 may delete only the icon 834 from the touchscreen 151. However, in certain embodiments the controller 180 may also delete the actual internet application from the memory 160 of the mobile terminal 100.

Figure 8D:
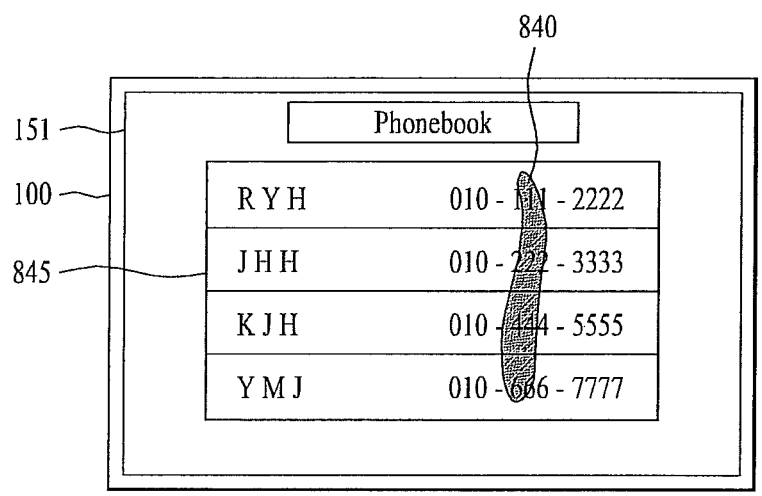
Figure 8D:
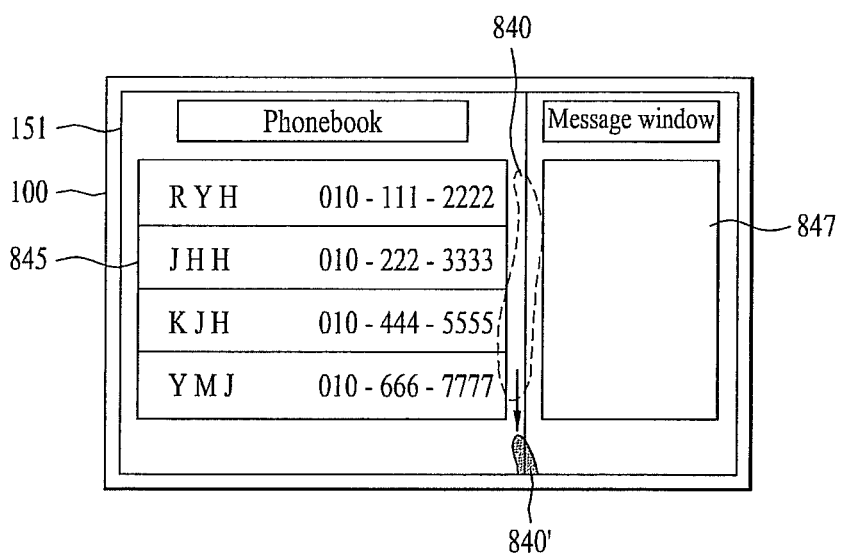

FIG. 8D illustrates yet another example of a control operation being performed with respect to the first touch pattern. When the touchscreen 151 receives an area touch motion corresponding to the first touch pattern while an execution window of an application is being displayed, the controller 180 may create a new additional/application execution window.

Referring to the example shown in FIG. 8D(a), a phonebook (or telephone directory) application is executed, and the touchscreen 151 displays a phonebook execution window 845. The touchscreen 151 receives an area touch 840 corresponding to the first touch pattern. Referring to FIG. 8D(b), when the touchscreen 151 receives an area touch motion 840/840' corresponding to the first touch pattern, the controller 180 creates and displays a new application execution window. For example, in addition to the initial phonebook execution window 845, the controller 180 may also create and display a message execution window 847. More specifically, in addition to the application (phonebook application) that was initially being executed, the controller 180 may also perform a multi-tasking operation by executing a new application (messaging application).

Figure 8E:
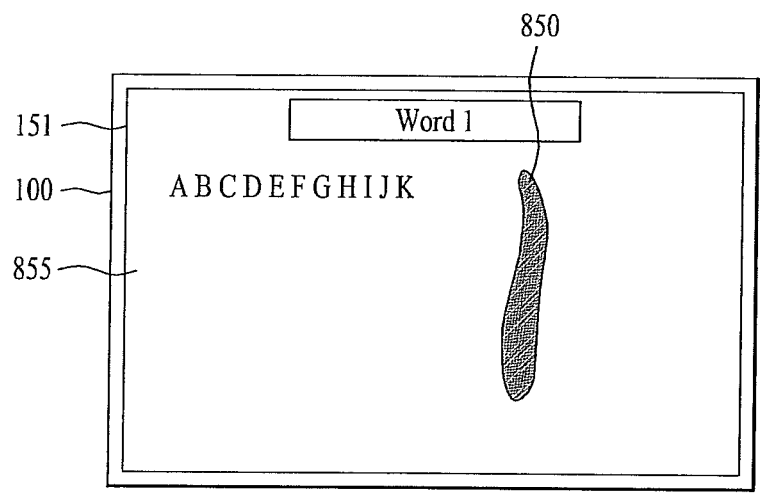
Figure 8E:
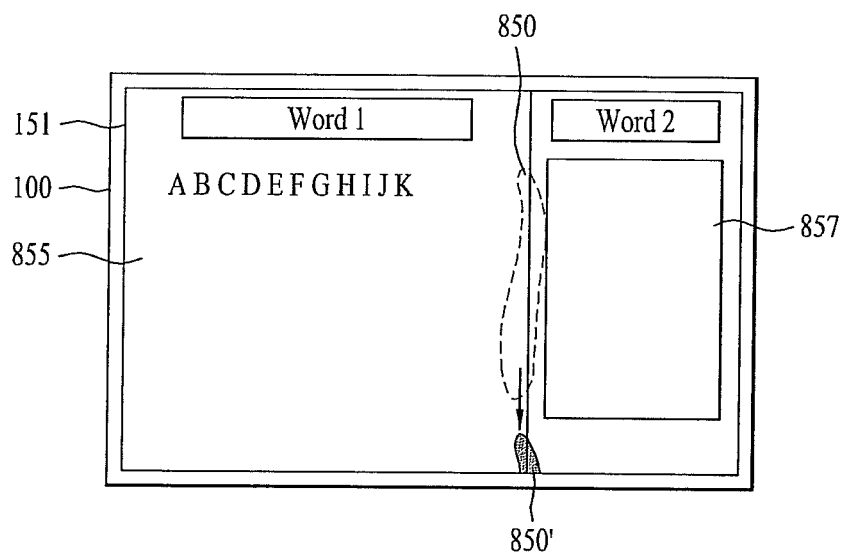

FIG. 8E illustrates yet another example of a control operation being performed with respect to the first touch pattern. When the touchscreen 151 receives an area touch motion corresponding to the first touch pattern while an execution window of an application is being displayed, the controller 180 may also create and display an execution window of a new file of the corresponding application.

Referring to FIG. 8E(a), the touchscreen 151 displays an execution window 855 of a specific file (Word 1) of the word processor application, and then the touchscreen 151 receives an area touch 850 and motion 850' corresponding to the first touch pattern. Referring to FIG. 8E(b), when the touchscreen 151 receives an area touch 850 the touch motion 850' corresponding to the first touch pattern, the controller 180 may create and display another file execution window of the same application. More specifically, in addition to the initial file execution window 855 of the same application (word processor application), the controller 180 may create and display a new file execution window 857 of the same application.

FIGS. 9A to 9D illustrate a display control operation corresponding to a second touch pattern in a mobile terminal as embodied and broadly described herein.

The second touch pattern corresponds to a pattern indicated by a motion of making a fist (or folding or squeezing the palm) and touching the touchscreen 151 with the fisted hand. Accordingly, when the touchscreen 151 is area touched using the second touch pattern, the controller 180 may perform a control operation corresponding to the second touch pattern. The control operation corresponding to the second touch pattern may be stored in advance in the memory 160. In certain embodiments, the control operation, which may be performed in accordance with the input of the second touch pattern, perform a function similar to the meaning implied (or intended) by the corresponding hand motion. More specifically, a hand motion for generating the second touch pattern includes a motion of making a fist. Thus, such an action may be interpreted as an action of crumpling (or combining) an object with the hand, an action of rumpling or discarding (or eliminating) an object, and so on. Accordingly, the control operation corresponding to the second touch pattern may perform a function similar to the motions interpreted as described above. For example, the control operation may include an operation of combining several contents item within the touchscreen 151 so as to create a new directory (content item), an operation of compressing a specific content item, an operation of reducing or deleting a specific content item, an operation of completing (or ending) a specific content item, and so on. Furthermore, in a case in which an application is being executed, the control operation may also include an operation of ending the application, an operation of compressing or storing a current execution file of an application, an operation of reducing the execution screen, and so on.

FIG. 9A illustrates a hand motion for generating a new directory icon as an example of a control operation corresponding to the second touch pattern.

FIG. 9A(a) shows an example wherein the touchscreen 151 receives an area touch motion 905/905' corresponding to the second touch pattern. The touchscreen 151 may recognize area touch motions 905 and 905' inputted by the user as the second touch pattern. And, accordingly, a control target that is to be controlled by the second touch pattern may be determined by the controller 180. The touchscreen 151 displays a plurality of icons 910a to 910f. Among the displayed icons 910a to 910f, specific icons 910a to 910d may be displayed as being selected by the second touch pattern. More specifically, specific icons 910a to 910d may be selected as control targets, and the controller 180 may perform the respective control operations on the corresponding control targets. Referring to FIG. 9A(b), a result of performing the control operation corresponding to the second touch pattern is displayed on the touchscreen 151. The selected specific icons 910a to 910d may be integrated, or grouped, by the control operation corresponding to the second touch pattern, and be collected within a single directory icon. As a result of the control operation, the touchscreen 151 may display the newly created directory icon 915. The directory icon 915 may correspond to an icon indicating a directory, which includes applications indicated by the selected specific icons 910a to 910d. When the newly created directory icon 915 is selected, the integrated icons 910a to 910d may also be displayed.

FIG. 9B illustrates a hand motion for deleting an icon as another example of a control operation corresponding to the second touch pattern.

FIG. 9B(a) shows an example wherein the touchscreen 151 receives an area touch motion 905/905' corresponding to the second touch pattern. The touchscreen 151 may recognize area touch motions 905 and 905' inputted by the user as the second touch pattern. And, accordingly, a specific icon 910a that exists within the movement trajectory of the second touch pattern may be determined to be the control target by the controller 180. When the controller 180 determines the corresponding icon 910a to be the control target, the controller 180 may perform the control operation corresponding to the second touch pattern on the corresponding icon 910a. As a result of the control operation, FIG. 9B(b) shows an exemplary operation by which the icon 910a is deleted from the touchscreen 151. The touchscreen 151 may display the operation of deleting the corresponding icon 910a through a display window 935.

Figure 9C:
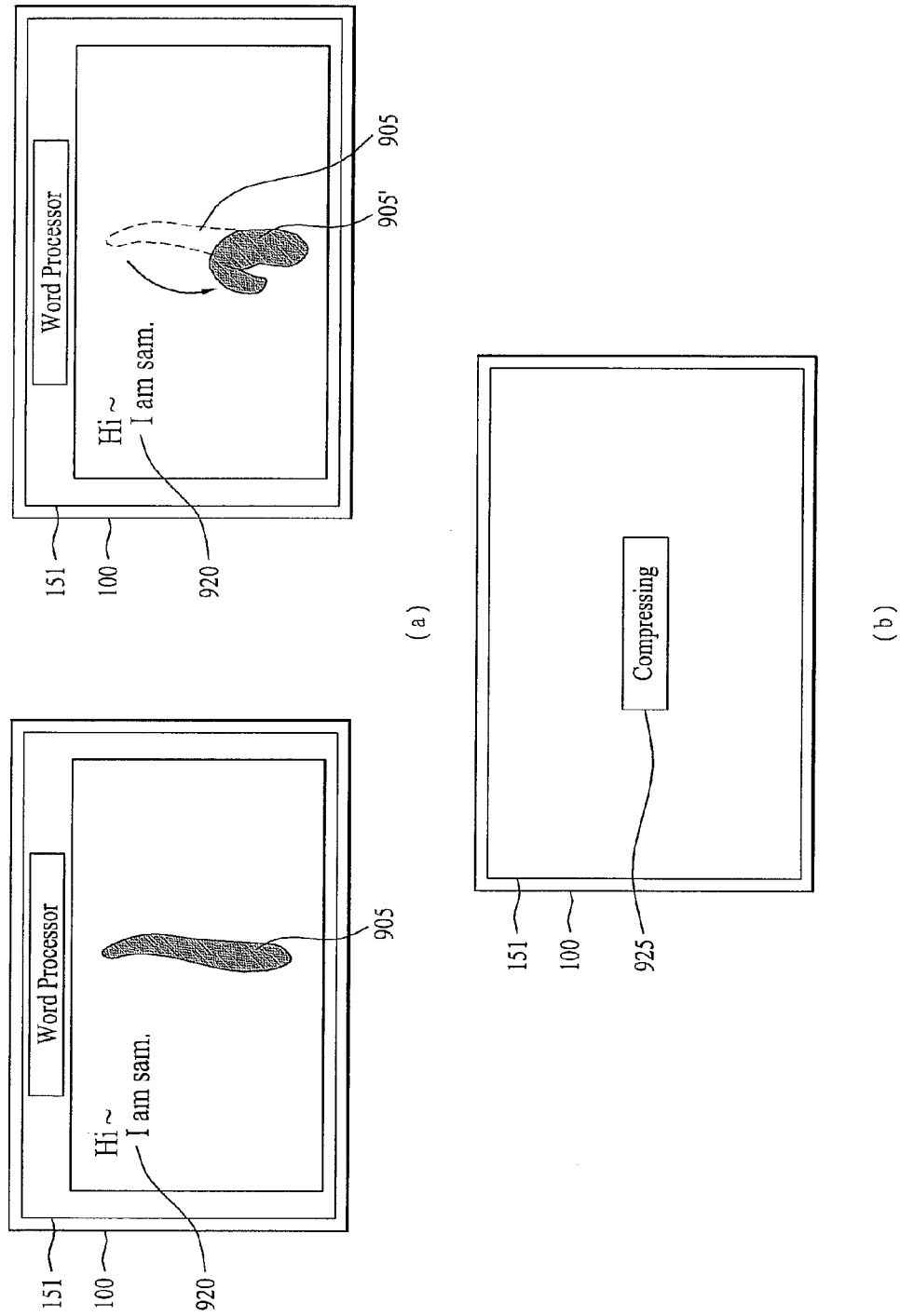

FIG. 9C illustrates a hand motion for performing compression as yet another example of a control operation corresponding to the second touch pattern.

Referring to FIG. 9C(a), a word processor program (or application) is executed as a specific application within the touchscreen 151. An exemplary operation through which the touchscreen 151 receives an area touch motion 905/905' corresponding to the second touch pattern is shown in FIG. 9C(a). Herein, the area touch motions 905 and 905' may be determined to be the second touch pattern. More specifically, FIG. 9C(a) shows an example wherein an area touch motion is inputted as the second touch pattern while the word processor program is being executed. In this case, the controller 180 determines the execution file of the corresponding word processor to be the control target. As a result of the control operation corresponding to the second touch pattern, FIG. 9C(b) shows an example wherein the corresponding word program (or word processor application) is compressed. The controller 180 may compress an execution file of the word processor application, which is determined by the controller 180 to be the control target, by using the control operation corresponding to the second touch pattern. The compression operation may be displayed on the touchscreen 151 through a display window 925. In a case in which an area touch motion is inputted as the second touch pattern while an application is being executed, in addition to the operation of compressing the corresponding application, an operation of storing (or saving) the corresponding program (or application), an operation of deleting and/or ending (or terminating) the corresponding program, and so on, may also be included as the control operation corresponding to the second touch pattern.

FIG. 9D illustrates a hand motion for reducing a size of a display item as yet another example of a control operation corresponding to the second touch pattern.

FIG. 9D(a) shows an example wherein a message 940 is displayed on the display screen of the touchscreen 151 as an execution screen of a specific application, and wherein the touchscreen 151 receives an area touch motion 905/905' corresponding to the second touch pattern. The example shown in FIG. 9D(a) corresponds to an example wherein area touch motions 905 and 905' are determined to be the second touch pattern. In this case, the controller 180 may determine the message window that is being displayed to be the control target. As a result of the control operation corresponding to the second touch pattern, FIG. 9D(b) shows an example of the corresponding message window 940/940' being reduced in size and displayed. Since the motion of making a fist may be interpreted as a motion of making an object smaller, based upon such interpretation, the controller 180 may reduce the size of the execution window of the current application.

Although FIG. 9D shows that a message may be reduced in size and displayed after receiving a respective area touch motion as the second touch pattern, based upon the movement amount of the area touch motion corresponding to the second touch pattern, the execution window may also be reduced at the same time.

In the description of FIG. 6C, the third touch pattern included a fisted hand opening wide. More specifically, the third touch pattern may correspond to a touch pattern opposite the second touch pattern. Therefore, the control operation corresponding to the third touch pattern may include an operation of opening (or unfolding) and/or enlarging an object. When an area touch motion is inputted with respect to the third touch pattern, the controller 180 may perform operations opposite to the control operation corresponding to the second touch pattern. More specifically, in a case in which a content item is compressed, the controller 180 may perform an operation of decompressing the content item, an operation of enlarging a screen window or a specific content item, and, in a case of a directory, the controller 180 may also perform an operation of opening the directory.

FIGS. 10A to 10F illustrate a display control operation corresponding to a fourth touch pattern. The fourth touch pattern corresponds to a hand motion having an open palm being moved along the opened direction of the hand and, along the vertical direction, making contact with the touchscreen 151. Accordingly, when an area of the touchscreen 151 is touched (i.e., area touched) with respect to the fourth touch pattern, the controller 180 may perform a control operation corresponding to the fourth touch pattern. Herein, control operations corresponding to the fourth touch pattern may be stored in advance in the memory 160.

The control operation, which may be performed in accordance with the input of the fourth touch pattern, may perform a function similar to the meaning implied (or intended) by the corresponding hand motion. More specifically, the hand motion of the fourth touch pattern may be interpreted as an action of moving (or relocating) an object, an action of removing (or discarding) an object, an action of creating (or generating) an object, and so on. Accordingly, the control operation corresponding to the fourth touch pattern may perform a function similar to the meanings implied (or intended) by the above-described hand motion. For example, the control operation may include an operation of moving (or relocating) specific icons, an operation of selecting specific icons, an operation of backing-up and/or compressing specific icons, and so on. Furthermore, while an application is being executed, the control operation may include an operation of moving (or relocating) the execution screen itself, an operation of backing up the application, an operation of creating a new display window within the execution screen, and so on.

Figure 10A:
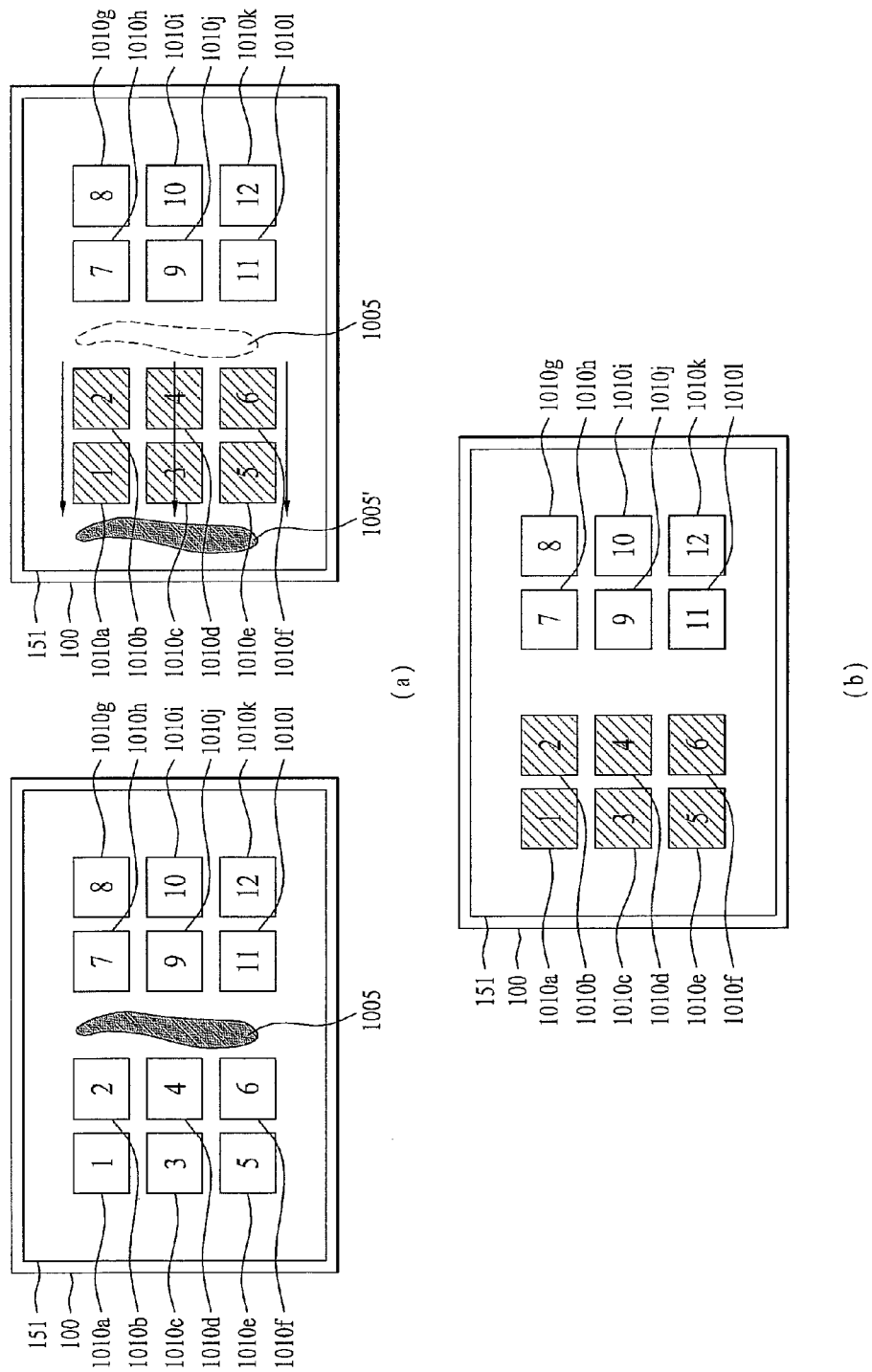
FIGS. 10A to 10F illustrate exemplary display control operations corresponding to a fourth touch pattern according to an embodiment as broadly described herein.

FIG. 10A illustrates a hand motion for selecting icons as an example of a control operation corresponding to the fourth touch pattern. As an example of the control operation, the touchscreen 151 shows an exemplary operation of selecting specific icons 101a through 1010f of a plurality of icons 1010a through 10101 displayed on the touchscreen 151.

FIG. 10A(a) shows an example wherein the touchscreen 151 receives an area touch motion 1005/1005' corresponding to the fourth touch pattern. The touchscreen 151 may recognize area touch motions 1005 and 1005' inputted by the user as the fourth touch pattern, and a control target that is to be controlled by the fourth touch pattern may be determined by the controller 180. Among the displayed icons 1010a and 10101, specific icons 1010a to 1010f may be displayed as being selected by the fourth touch pattern. Referring to FIG. 10A(b), the specific icons 1010a to 1010f are selected by the control operation corresponding to the fourth touch pattern and are then displayed. More specifically, the icons 1010a to 1010f that exist within the movement trajectory of the hand motion corresponding to the fourth touch pattern are selected by the user as the control targets, thereby being displayed so as to be identified. The selected icons 1010a through 1010f may be subject to additional control operations performed by the user. For example, according to the additional control operations, in a case in which the selected icons 1010a through 1010f are targets of a copy command, the selected icons 1010a through 1010f may be copied. Alternatively, in case the selected icons 1010a through 1010f are targets of a deletion command, the selected icons 1010a through 1010f may be deleted.

Figure 10B:
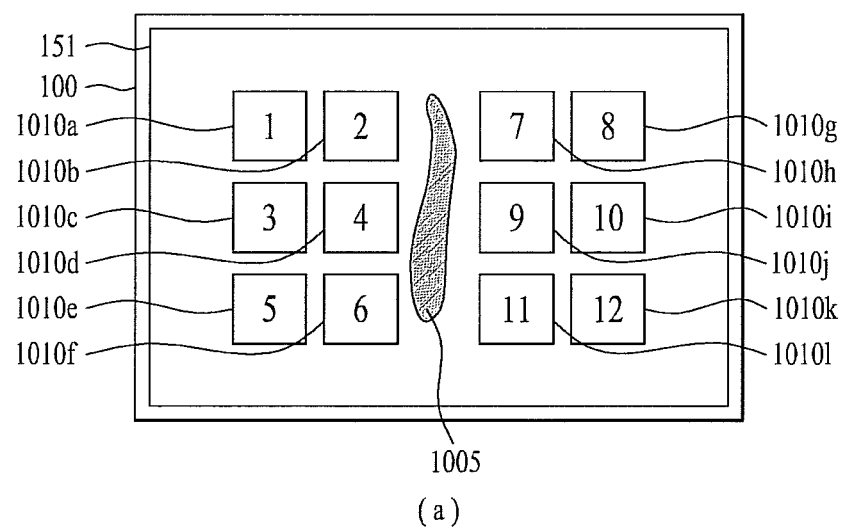
Figure 10B:
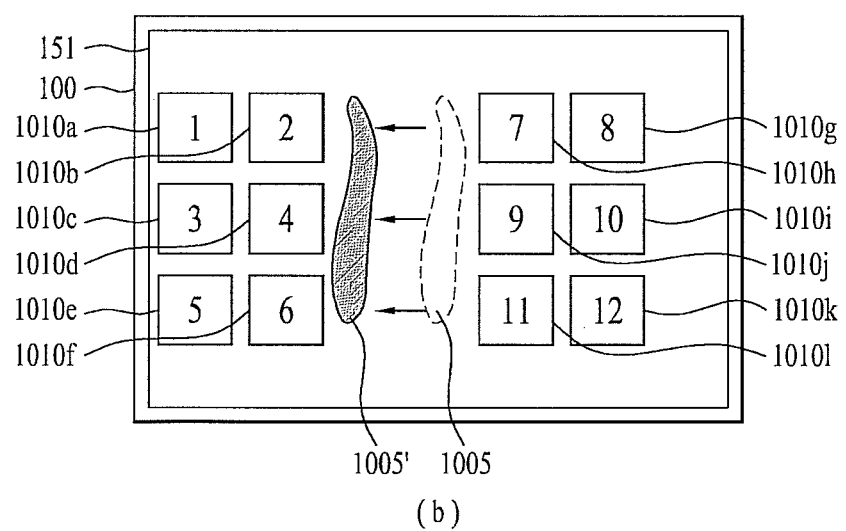

FIG. 10B illustrates a hand motion for moving (or relocating) icons as another example of a control operation corresponding to the fourth touch pattern.

FIG. 10B(a) shows an example wherein a specific area of the touchscreen 151 receives an initial area touch motion 1005 corresponding to the fourth touch pattern. Referring to FIG. 10B(b), the touchscreen 151 receives a final area touch motion 1005' from the initial area touch motion 1005 corresponding to the fourth touch pattern. Upon receiving the fourth touch pattern, the controller 180 performs an operation of moving (or relocating) icons as a control operation corresponding to the fourth touch pattern. More specifically, as an area touched portion is moved (or relocated), icons 1010a to 1010f that exist within the moving direction of the touched area may be moved along with the moving touch area. Although it is not specifically shown in the drawing, an icon display may be controlled in order to notify the movement status of the icons. For example, the icon display may be displayed in diverse forms, such as in the form of the icons being swept towards the movement direction, the form of the icons being rolled, the form of the icons being piled up, and so on.

Figure 10C:
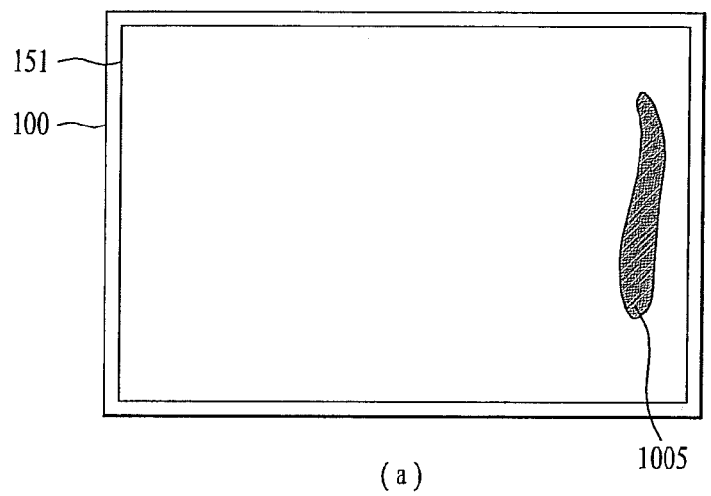
Figure 10C:
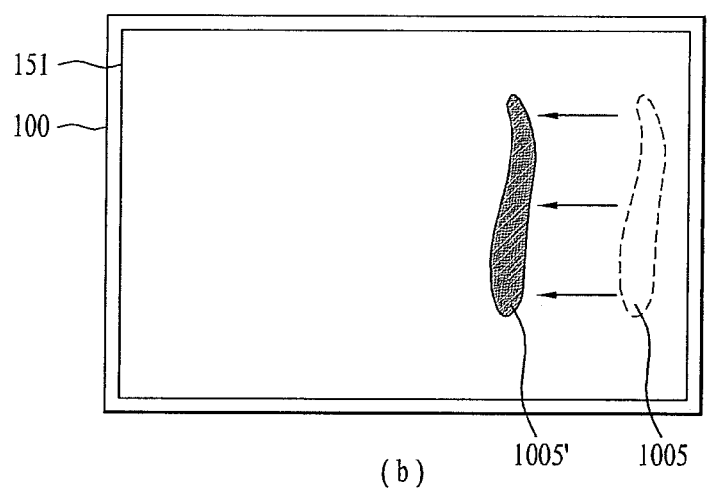
Figure 10C:
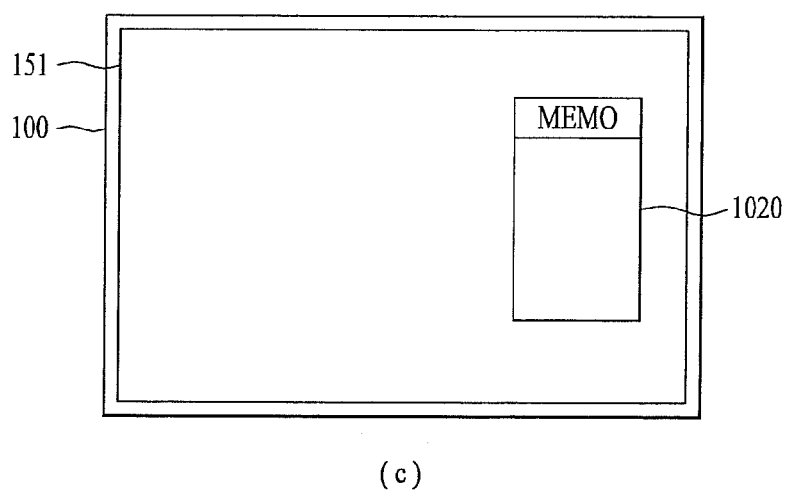

FIG. 10C illustrates a hand motion for creating a new execution window (or command window) as yet another example of a control operation corresponding to the fourth touch pattern. Since the fourth touch pattern corresponds to a touch pattern moving towards a single direction, the movement trajectory of the fourth touch pattern may generate a specific form (or shape). The touchscreen 151 may be controlled so that a new execution window (or command window) may be created within the specific form.

Referring to FIG. 10C(a), the touchscreen 151 may display a home screen state, or display an execution screen of an application, or display a plurality of icons. Herein, the touchscreen 151 receives an initial area touch motion 1005 of the fourth touch pattern. Referring to FIG. 10C(b), the touchscreen 151 receives a final area touch motion 1005' of the fourth touch pattern from the initial area touch motion 1005. As the final area touch motion 1005' of the fourth touch pattern is received from the initial area touch motion 1005, the touchscreen 151 recognizes such area touch motion as the fourth touch pattern. Referring to FIG. 10C(c), the controller 180 generates a new execution window (or command window) 1020 in the area corresponding to the movement trajectory of the fourth touch pattern, and the controller 180 may then display a detailed memo (or note) with the contents of the newly generated execution window (or command window) 1020.

The generation of a new execution window (or command window) 1020 may be performed along with the reception of the fourth touch pattern. More specifically, instead of generating the new execution window (or command window) 1020 after the final area touch motion 1005' of the fourth touch pattern is completed, the new execution window (or command window) 1020 may be generated at the moment the initial area touch motion 1005 is inputted. Thereafter, the touchscreen 151 may be controlled so that the size of the newly created execution window (or command window) 1020 can be changed in accordance with the progress of the area touch motion.

Figure 10D:
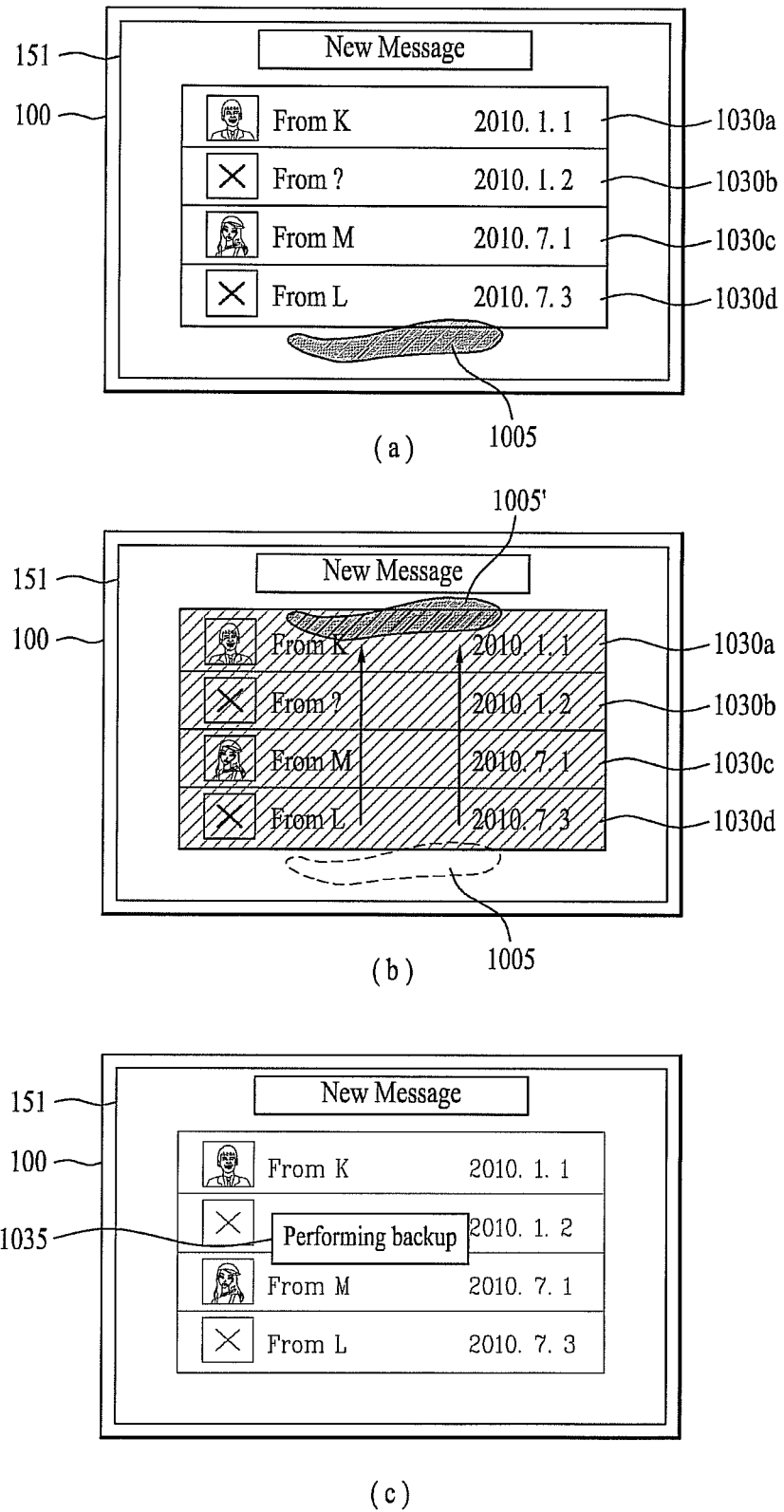

FIG. 10D illustrates a hand motion for performing a backup operation as yet another example of a control operation corresponding to the fourth touch pattern. In a case in which the fourth touch pattern is received while an application is being executed, the touchscreen 151 may be controlled so that the currently executed application may be backed up. Additionally, in a case in which the fourth touch pattern is received while various files are being displayed, the touchscreen 151 may also be controlled so that the corresponding files may be backed up.

Referring to FIG. 10D(a), the touchscreen 151 displays a received message list. The touchscreen 151 displays messages 1030a through 1030d that are received from multiple counterparts. The touchscreen 151 receives an initial area touch motion 1005 of the fourth touch pattern. Referring to FIG. 10D(b), the touchscreen 151 receives a final area touch motion 1005' of the fourth touch pattern from the initial area touch motion 1005. As the area touch motions 1005 and 1005' of the fourth touch pattern are received, the touchscreen 151 recognizes such area touch motions as the fourth touch pattern. Based upon the fourth touch pattern, the controller 180 may select the messages 1030a through 1030d to be the control targets. Although it is shown in FIG. 10D(b) that all of the messages 1030a to 1030d are selected by the fourth touch pattern, based upon the position of the final area touch motion

1005', some of the messages may be excluded from being selected. FIG. 10D(c) illustrates an example in which the controller 180 performs an operation of backing up the selected received messages upon the input (or reception) of the fourth touch pattern. As the fourth touch pattern is being inputted, the received messages that are selected by the inputted fourth touch pattern may be backed up by a control operation corresponding to the fourth touch pattern.

As described above, an example of a control operation by which multiple icons are selected by an area touch motion corresponding to a specific touch pattern and then displayed. The selected icons may also include icons that are not intended by the user to be selected. In this case, there exists a method for excluding unwanted icons. For example, various methods of excluding unwanted icons may exist, such as a method of dragging or touching the unwanted icons, a method of shaking the mobile terminal 100 so as to realign the selected icons, thereby excluding the unwanted icons, and so on.

Figure 10E:
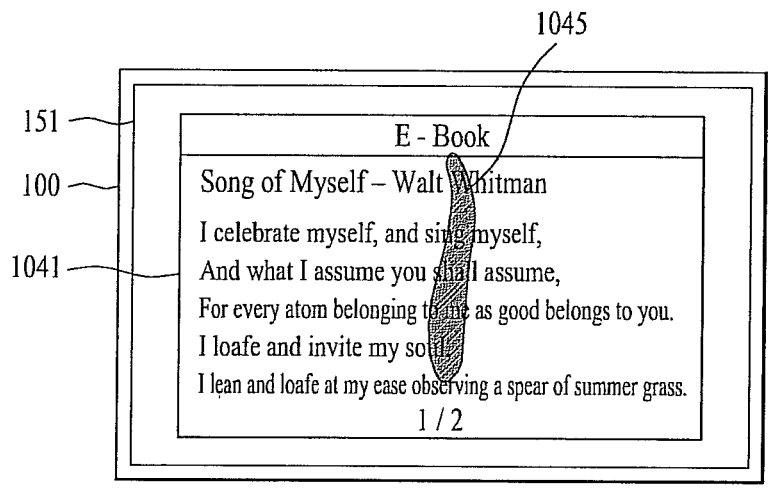
Figure 10E:
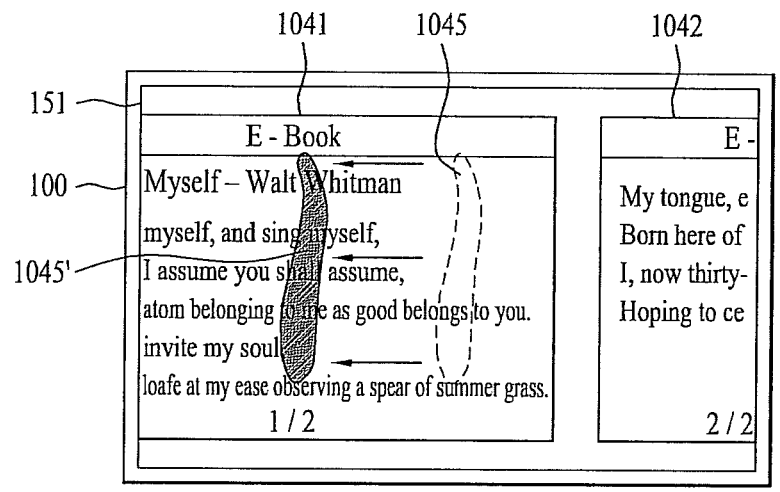

FIG. 10E illustrates a hand motion for performing an operation of moving (or relocating) an execution window of an application as yet another example of a control operation corresponding to the fourth touch pattern. When receiving the fourth touch pattern while an application is being executed, the touchscreen 151 may be controlled so that the execution window of the current application may be moved (or relocated). Since the fourth touch pattern includes a pattern corresponding to moving a hand blade in one direction, in a case in which an area touch motion 1045/1045' corresponding to the fourth touch pattern is received, the controller 180 may control the touchscreen 151 so that the execution window itself of the current application may be moved (or relocated).

Referring to FIG. 10E(a), the touchscreen 151 may execute, for example, an E-Book application as the specific application and may display the corresponding execution window 1041. The touchscreen 151 receives an initial area touch motion 1045 of the fourth touch pattern. Referring to FIG. 10E(b), the touchscreen 151 receives area touch motions 1045 and 1045' of the fourth touch pattern, and as the area touch motions corresponding to the fourth touch pattern are received, the controller 180 controls the touchscreen 151 so that the corresponding execution window 1041 may be moved (or relocated). As the area touch is moved to the area touch motion 1045' of the fourth touch pattern, the execution window 1041 of the current application may also be moved along with the area touch motion, thereby being displayed. Furthermore, in a case in which the execution window is configured of multiple screens, and not of a single screen, such as the E-Book application, the touchscreen 151 may move (or relocate) the initial execution window 1041 so as to display a next execution window 1042. More specifically, an effect of flipping the pages of a book may be provided on the touchscreen 151.

Figure 10F:
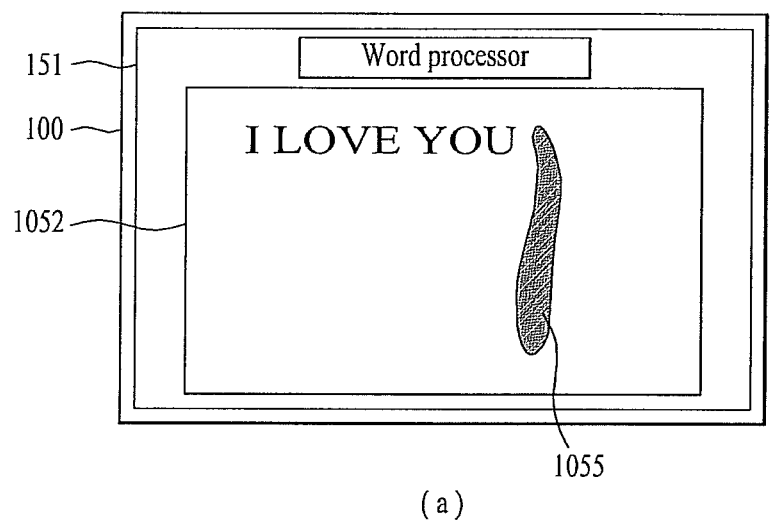
Figure 10F:
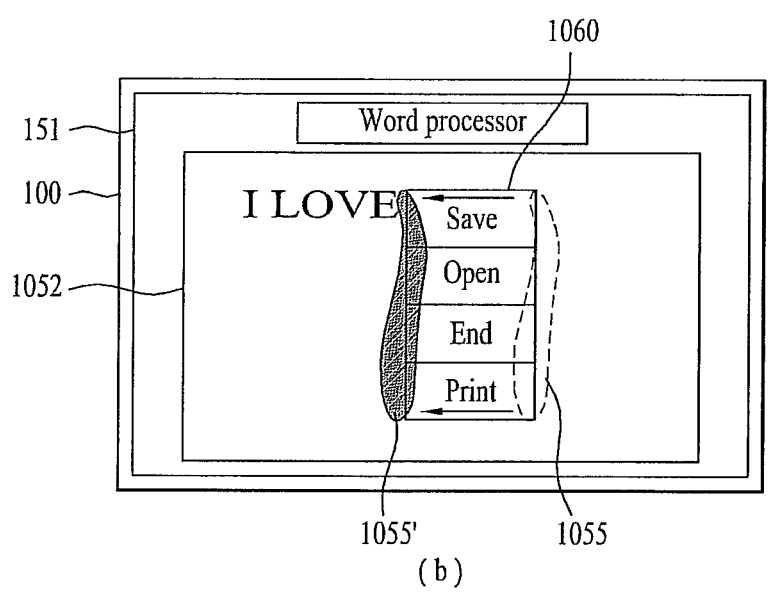

FIG. 10F illustrates a hand motion for creating a new menu window within an execution window of an application as yet another example of a control operation corresponding to the fourth touch pattern. When receiving the fourth touch pattern while an application is being executed, the touchscreen 151 may be controlled so that a menu window associated with the current application may be moved (or relocated).

Referring to FIG. 10F(a), the touchscreen 151 may execute a word processor program as the specific application and may display the corresponding execution window 1052. The touchscreen 151 receives an area touch motion 1055 corresponding to the fourth touch pattern with respect to the execution window 1052.

Referring to FIG. 10F(b), the touchscreen 151 receives area touch motions 1055 and 1055' of the fourth touch pattern, and as the area touch motions corresponding to the fourth touch pattern are received, the controller 180 controls the touchscreen 151 so that a menu window 1060 for the executed word processor program may be generated. As the area touch is moved to the area touch motion 1055' of the fourth touch pattern, new display windows may be generated for the touched areas. And, the new display window (or menu window) 1060 may include diverse command menus, such as save to diverse menus, open menu, end (or close) menu, print, and so on.

FIGS. 11A to 11D illustrate a display control operation corresponding to a fifth touch pattern of a mobile terminal as embodied and broadly described herein. The fifth touch pattern corresponds to a hand motion of a fist stamping (or pressing) on the touchscreen 151 and then releasing the stamping motion. Accordingly, when an area of the touchscreen 151 is touched (i.e., area touched) with respect to the fifth touch pattern, the controller 180 may perform a control operation corresponding to the fifth touch pattern.

The control operation, which may be performed in accordance with the input of the fifth touch pattern, may perform a function similar to the meaning implied (or intended) by the corresponding hand motion. More specifically, the hand motion of the fifth touch pattern may include a hand motion of stamping on the touchscreen 151 with the fist and then releasing the stamping motion, which may be interpreted as an action of fixing the position of an object, an action of pasting (or posting) an object, an action of pressing on an object, and so on. Accordingly, the control operation corresponding to the fifth touch pattern may perform a function similar to the meanings implied (or intended) by the above-described hand motion. For example, the control operation may include an operation of copying a specific icon within the touchscreen 151, an operation of pausing the operation of a specific content item, an operation of ending the execution of a specific content item, and so on. Additionally, while an application is being executed, the control operation may also include an operation of copying a predetermined area of an execution screen of the application, an operation of pasting the copied area, and an operation of storing (or storing) the copied area. Furthermore, when an application such as a moving picture (or image) is being executed, the control operation may include an operation of pausing the corresponding application.

Figure 11A:
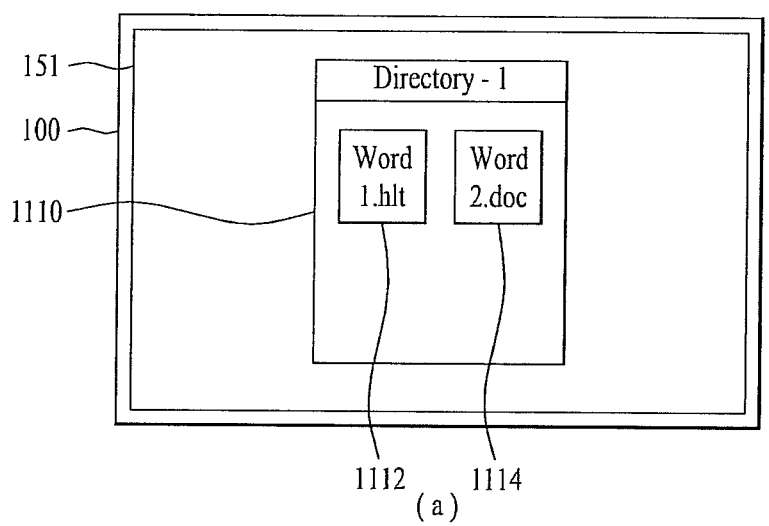
FIGS. 11A to 11D illustrate exemplary display control operations corresponding to a fifth touch pattern according to an embodiment as broadly described herein.
Figure 11A:
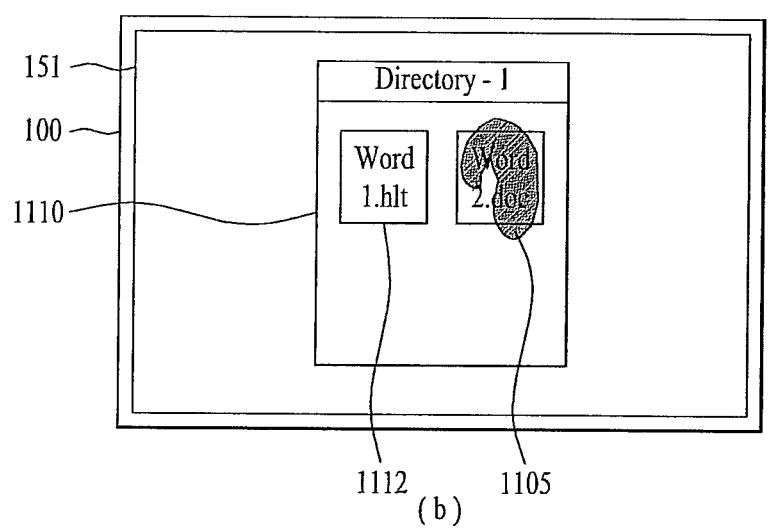

FIG. 11A illustrates a hand motion for copying a specific content item as an example of a control operation corresponding to the fifth touch pattern.

FIG. 11A(a) shows an example wherein one directory window 1110 includes two files 1112 and 1114. Referring to FIG. 11A(b), the touchscreen 151 receives an area touch motion 1105 corresponding to the fifth touch pattern with respect to a specific file 1114 among the two files 1112 and 1114 included in the directory window 1110. When receiving the area touch motion corresponding to the fifth touch pattern through the touchscreen 151, the controller 180 determines the touched position, the touched surface area, and so on of the area touched by the area touch motion, so as to determine the object that is to be copied (i.e., copy object). Referring to FIG. 11A(b), a specific file 1114 may be selected by the fifth touch pattern 1105, and the corresponding file 1114 may be copied accordingly.

Figure 11B:
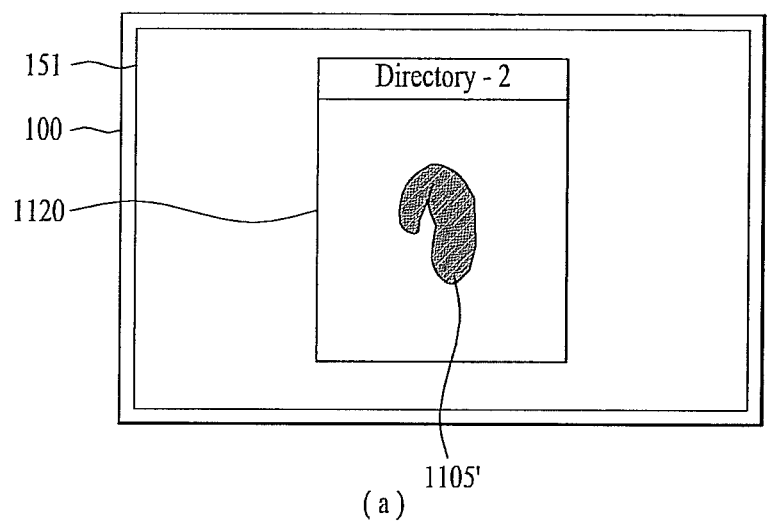
Figure 11B:
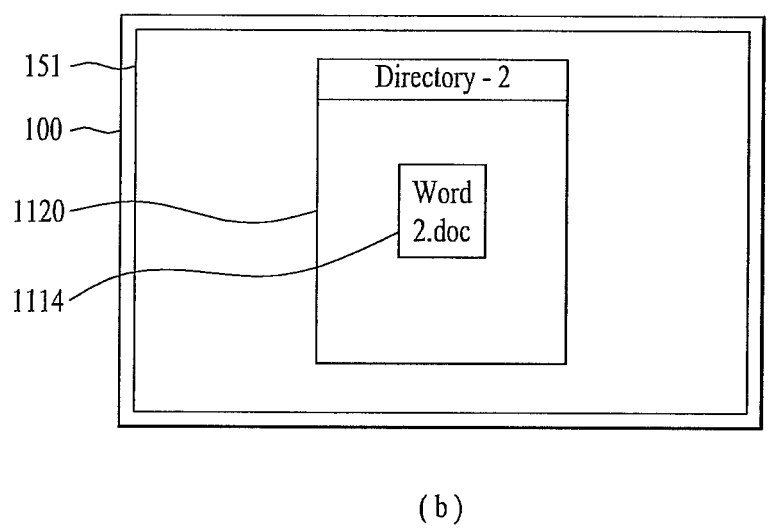

FIG. 11B illustrates a hand motion for pasting a copied version of a specific content item as an example of a control operation corresponding to the fifth touch pattern.

Referring to FIG. 11B(a), a new directory window 1120 is displayed. Then, an area touch motion 1105' corresponding to the fifth touch pattern is inputted to the corresponding directory window 1120. As shown in FIG. 11B(b), when the fifth touch pattern is received, the controller 180 performs a pasting operation as the control operation corresponding to the fifth touch pattern. More specifically, the controller 180 may determine the position of the area touched by the area touch motion (i.e., the area touch position), so as to perform the operation of pasting the copied file to the respective position.

Figure 11C:
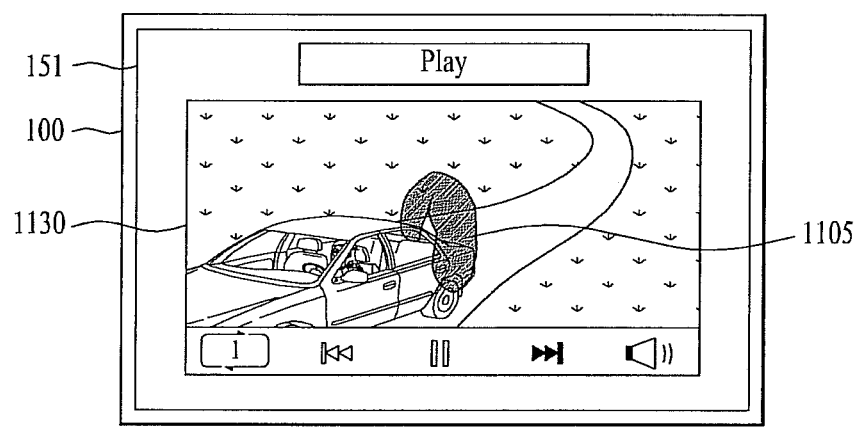
Figure 11C:
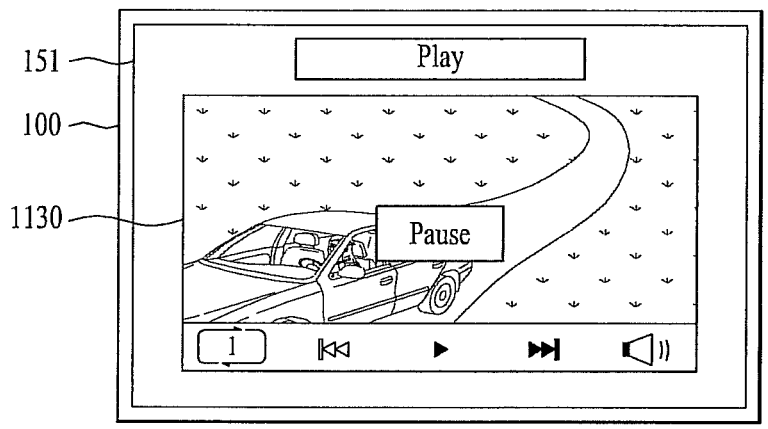

FIG. 11C illustrates a hand motion, for pausing an application that is being executed as an example of a control operation corresponding to the fifth touch pattern.

Referring to FIG. 11C(a), when a moving image (or picture) playback application is operated as the specific application, the touchscreen 151 displays the corresponding moving image through a playback window 1130. The touchscreen 151 receives an area touch motion 1105 corresponding to the fifth touch pattern. As shown in FIG. 11C(b), the controller 180 may pause (or stall) the playback application as the control operation corresponding to the fifth touch pattern. As a control operation of the controller 180, the touchscreen 151 may pause (or stop) the moving picture that is being played-back. Since the area touch motion corresponding to the fifth touch pattern corresponds to a hand motion of pressing on the touchscreen 151 with the fist, and since the action of pressing on the touchscreen 151 may be interpreted as action of fixing on object to a predetermined position, in a case in which a moving image is being played-back, as shown in FIG. 11C, the controller 180 may pause (or stop) the moving image that is being played-back as the control operation corresponding to the fifth touch pattern.

Figure 11D:
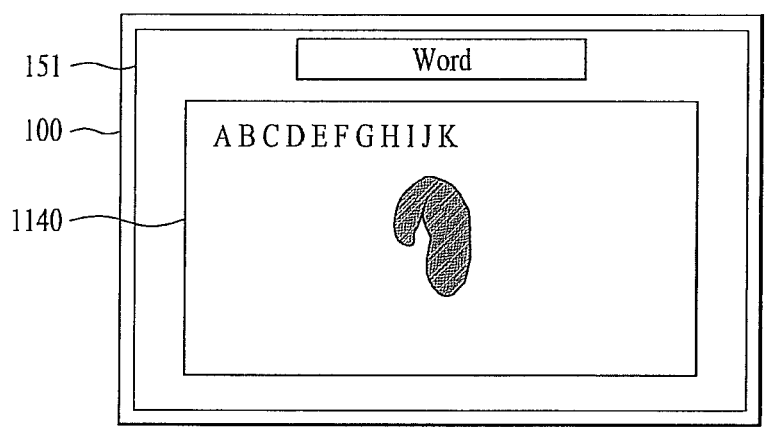
Figure 11D:
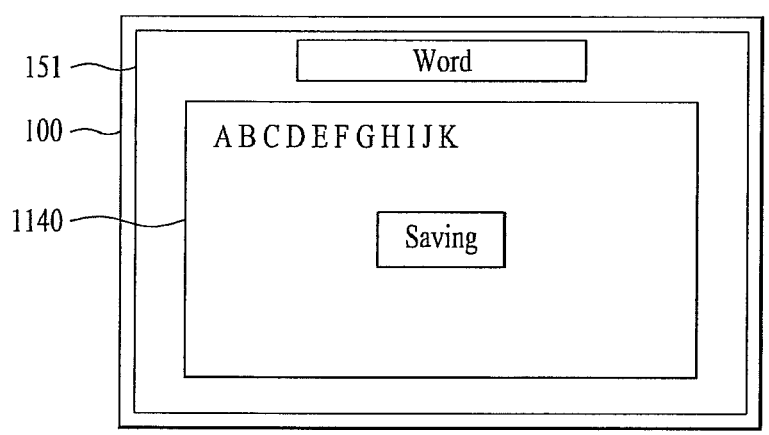

FIG. 11D illustrates a hand motion for storing (or saving) an application that is being executed as an example of a control operation corresponding to the fifth touch pattern.

Referring to FIG. 11D(a), when a word processor program is executed as the specific application, the touchscreen 151 displays an execution window 1140 of the corresponding word processor program. The touchscreen 151 receives an area touch motion 1105 corresponding to the fifth touch pattern. As shown in FIG. 11D(b), the controller 180 may store the application that is being executed as the control operation corresponding to the fifth touch pattern. When the area touch motion corresponding to the fifth touch pattern is received through the touchscreen 151, the controller 180 may store (or save) a current file of a word processor program that is being executed and displayed. Meanwhile, the above-described control operation may be replaced with an operation of backing-up the current file of the word processor program currently being executed.

Figure 12:
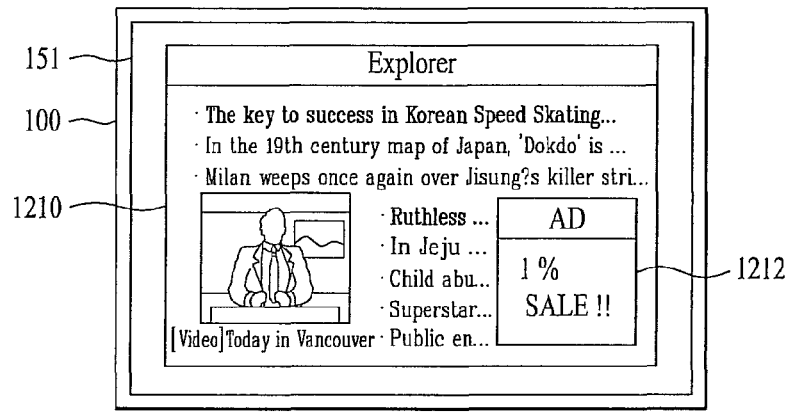
FIG. 12 illustrates an exemplary display control operation corresponding to a sixth touch pattern according to an embodiment as broadly described herein.
Figure 12:
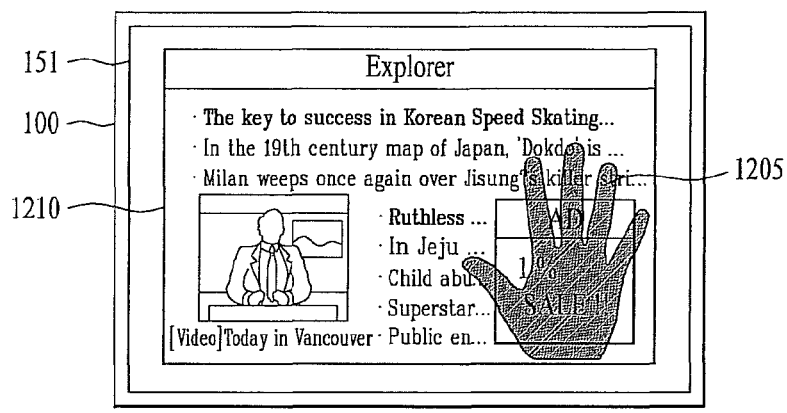
Figure 12:
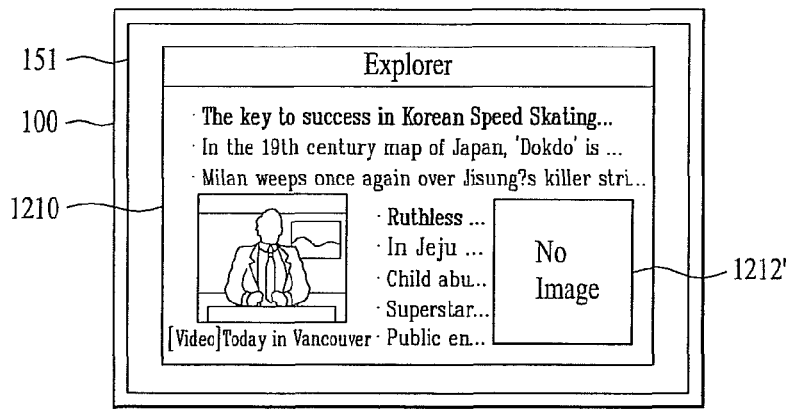

FIG. 12 illustrates a display control operation corresponding to a sixth touch pattern according to the present invention. The sixth touch pattern corresponds to a hand motion of touching the touchscreen 151 while covering a predetermined area of the touchscreen 151. Accordingly, when an area of the touchscreen 151 is touched (i.e., area touched) with respect to the sixth touch pattern, the controller 180 may perform a control operation corresponding to the sixth touch pattern. The control operation, which may be performed in accordance with the input of the sixth touch pattern, may perform a function similar to the meaning implied (or intended) by the corresponding hand motion. More specifically, the hand motion creating the sixth touch pattern may include a hand motion of covering an object, which may be interpreted as an action of covering or hiding an object that is not wished to be seen. Accordingly, the control operation corresponding to the sixth touch pattern may perform a function similar to the meanings implied (or intended) by the above-described hand motion. For example, the control operation may include an operation of pausing the display of a specific area that is being displayed on the touchscreen 151, an operation pausing a specific advertisement content of an internet web site while using the internet, and so on.

Referring to FIG. 12(a), the touchscreen 151 displays a specific internet web site 1210. Various content items of the displayed internet web site 1210 are shown including unwanted advertising content 1212. Referring to FIG. 12(b), the touchscreen 151 receives an area touch motion 1205 corresponding to the displayed advertising content 1212. When it is determined that the inputted area touch motion corresponds to the sixth touch pattern, the controller 180 may perform a control operation corresponding to the sixth touch pattern. Referring to FIG. 12(c), as a result of performing the control operation corresponding to the sixth touch pattern, the controller 180 may control the touchscreen 151 so that the advertising content 1212' covered or hidden by the area touch motion may disappear. More specifically, when controller 180 receives the area touch motion corresponding to the sixth touch pattern through the touchscreen 151, the controller 180 may control the touchscreen 151 so that the function of the corresponding touched area are paused, or so that none of the images of the corresponding area are visible.

Meanwhile, when the control operation corresponding to the sixth touch pattern is performed, in a case in which the images of the specific area become invisible or in a case in which the display of the specific area is paused, the touchscreen 151 may enlarge the area of the touchscreen 151 excluding the specific area, thereby maintaining the display of the enlarged area. Furthermore, even if the specific area becomes invisible due to the corresponding control operation, settings may be made so that the hidden area may be visible once again, when another touch motion or command is inputted by the user.

Figure 13A:
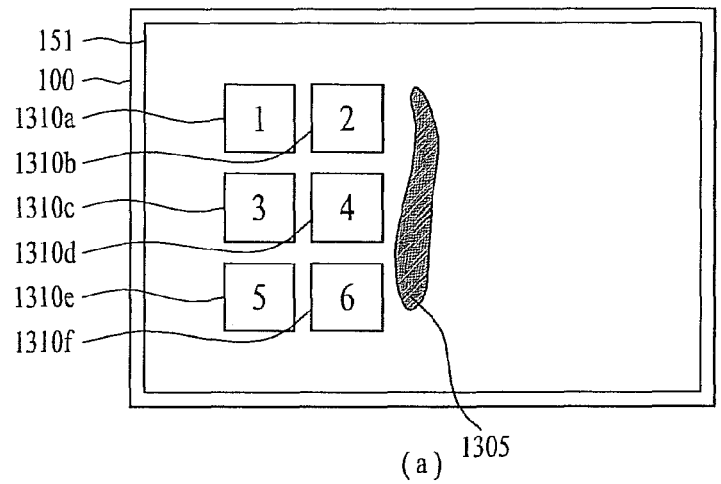
FIGS. 13A and 13B illustrate a successive display control operation according to an embodiment as broadly described herein.
Figure 13A:
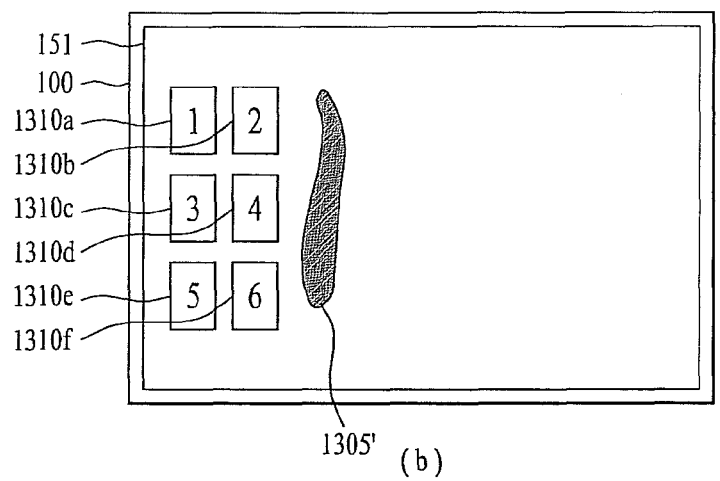
Figure 13A:
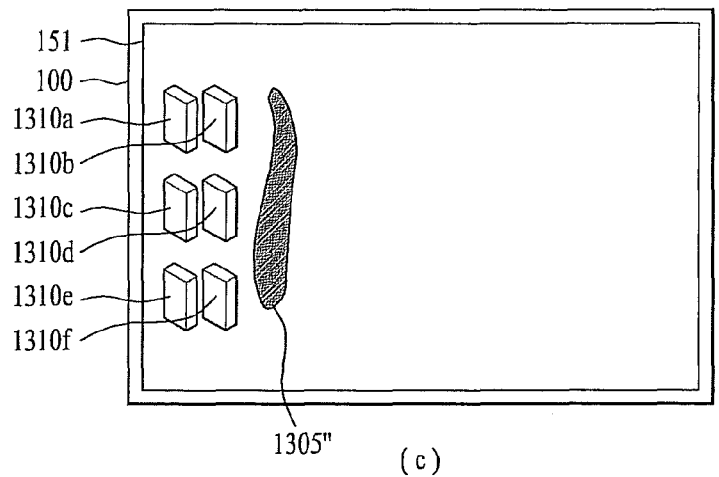
Figure 13B:
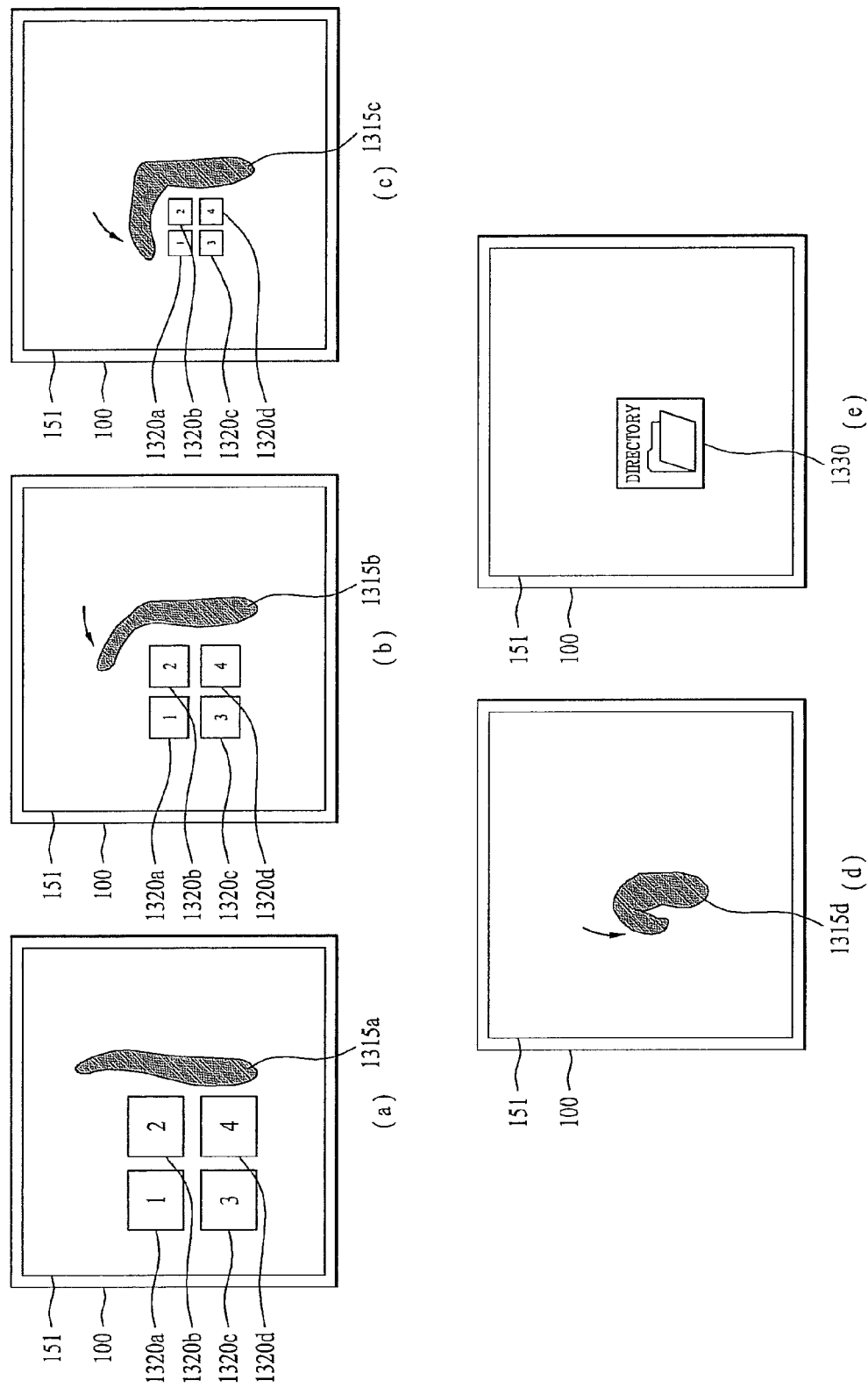

FIGS. 13A and 13B illustrate a successive display control operation of a mobile terminal as embodied and broadly described herein.

The area touch motion according to the present invention may correspond to a static touch motion touching only one area of the touchscreen 151. However, the area touch motion may also correspond to a mobile touch motion, wherein the touch area itself is being moved. The above-described touch patterns correspond to touch patterns corresponding to mobile touch operations. Therefore, such touch patterns may vary depending upon the touch motion inputted by the user.

When the touch area is variable, the controller 180 analyzes the degree of change in the touch area, thereby being capable of controlling execution windows of content items (icons, thumbnail images, images, and so on) or applications, which correspond to the control target. For example, as an area touched by a hand motion is being moved, the icons that are to be controlled may also be moved in accordance with the moving touch area.

FIG. 13A illustrates a successive display control operation corresponding to the fourth touch pattern.

Referring to FIG. 13A(a), the touchscreen 151 displays a plurality of icons 1310a to 1310f, and then the touchscreen 151 receives a touch area 1305 from the user. Referring to FIG. 13A(b), as the touch area is being moved, the plurality of icons 1310a to 1310f is also changed (or varied). More specifically, the plurality of icons 1310a to 1310f, which corresponds to the control targets, may be controlled so that the respective positions can be changed. Additionally, the plurality of icons 1310a to 1310f may also be controlled so that the size of each icon can be changed so as to provide a specific visual effect. Referring to FIG. 13A(c), as the touch area is further moved, the plurality of icons 1310a to 1310f may be gathered at a left side of the touchscreen 151. Simultaneously, in order to provide a visual effect, the plurality of icons 1310a to 1310f, which corresponds to the control targets, may be expressed and displayed in a three-dimensional form. More specifically, the control operation being performed by the area touch motion may also be visually expressed and displayed.

In certain embodiments, the display control operation performed on the control target may be varied in accordance with the movement rate (or speed) of the area touch motion. For example, it is assumed that an area touch motion is performed at a rate of '1', and that the moved distance of the content being the control target is marked and displayed as '1'. In this case, when the area touch motion is performed at a rate of '2', which is two times faster than the assumed movement rate, the moved distance of the content being the control target may then be marked and displayed as '2'.

FIG. 13B illustrates a successive display control operation corresponding to the third touch pattern.

With respect to gradual movements of the touched areas corresponding to the third touch pattern, FIGS. 13B(a) to 13B(e) respectively illustrate examples of the size of each icon 1320a to 1320d being varied and displayed accordingly. Referring to FIG. 13B(a), a plurality of icons 1320a to 1320d is displayed on the touchscreen 151, and a first area touch 1315a corresponding to the third touch pattern is inputted to the touchscreen 151. Referring to FIG. 13B(b), as a second area touch 1315b of the third touch pattern is inputted, icons 1320a to 1320d corresponding to the control targets have their sizes reduced. Referring to FIG. 13B(c), as a third area touch 1315c of the third touch pattern is inputted, the icons 1320a to 1320d have their sizes reduced to even smaller sizes. Referring to FIG. 13B(d), as a fourth area touch 1315d of the third touch pattern is inputted, the shape of the touch area corresponds to a hand motion of making a tight fist. Referring to FIG. 13B(e), as a result of the control operation corresponding to the third touch pattern, the icons 1320a to 1320d may be generated in a new directory 1330.

More specifically, depending upon the movement amount of each area touch motion corresponding to the third touch pattern, by performing a control operation corresponding to the third touch pattern, a gradual change in the control target may be displayed in the touchscreen 151.

According to one embodiment as broadly described herein, the above-described image display methods may be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet).

The above-described mobile terminal may be configured so that the configuration and method according to the above-described embodiments may be applied by a wide range of variation and not to be applied with limitations. Accordingly, for a wider variation of the embodiments, a mobile terminal as embodied and broadly described herein may be configured of an optional combination of all of the features or partial features of the embodiments as broadly described herein.

The mobile terminal and the method for controlling the same according to at least one embodiment as broadly described herein having the above-described configuration may have the following advantages.

Instead of receiving a touch motion of only one specific point within the touchscreen, the mobile terminal and the method for controlling the same according to at least one embodiment as broadly described herein having the above-described configuration may receive a touch area touched by the area touch method. Since the touch area may include various information such as the shape, surface area, position, movement rate (or speed), movement trajectory, and so on, of the touched area, an input including diverse information may be acquired depending upon the inputted touch area.

Furthermore, when an area touch motion is inputted, the mobile terminal and the method for controlling the same according to at least one embodiment as broadly described herein having the above-described configuration various control operations corresponding to the inputted area touch motion may be realized on the touchscreen.

Advantages are not limited only to the above-described advantages. Therefore, other advantages, which have not been mentioned in this description, may be apparent to those having ordinary skill in the art upon examination of the description provided herein or may be learned from practice of the embodiments as broadly described herein.

A mobile terminal and a method for controlling the same as embodied and broadly described herein may control content or an application displayed on a touchscreen by using a control method corresponding to an area touch motion inputted through the touchscreen.

A mobile terminal and a method for controlling the same as embodied and broadly described herein may control content or an application displayed on a touchscreen by using a control method corresponding to a touch pattern, which is realized by a hand motion performed as the area touch motion.

A mobile terminal as embodied and broadly described herein may include a touchscreen configured to display at least one content on a screen and to receive an area touch motion respective to one area of the screen, and a controller configured to analyze the area touch motion and to control a specific content, among the at least one content, as a content control operation corresponding to the received area touch motion based upon the analyzed result.

In certain embodiments, the controller of the mobile terminal may use at least one of a shape of the area touch motion, a surface area of the area touch motion, a position of the area touch motion, a movement rate (or speed) of the area touch motion, and a movement trajectory of the area touch motion, so as to analyze the area touch motion.

When the analyzed area touch motion matches with a predetermined touch pattern, the controller may perform a content control operation respective to the touch pattern.

In certain embodiments, when the predetermined touch pattern is realized by a hand motion performing a specific action while touching the touchscreen, the predetermined touch pattern may correspond to a touch pattern displayed on the touchscreen.

The content may include at least one of an icon, a thumbnail image, and a file image that can be displayed on the screen.

A method for controlling a display in a mobile terminal as embodied and broadly described herein may include displaying at least one content on a screen within a touchscreen, receiving an area touch motion respective to one area of the screen, analyzing the area touch motion, and controlling a specific content, among the at least one content, as a content control operation corresponding to the received area touch motion based upon the analyzed result.

A mobile terminal in accordance with another embodiment as broadly described herein may include a touchscreen configured to display an execution screen of an application on a screen and to receive an area touch motion respective to one area of the execution screen, and a controller configured to analyze the area touch motion and to control an application as an application control operation corresponding to the received area touch motion based upon the analyzed result.

When the analyzed area touch motion matches with a predetermined touch pattern, the controller may perform an application control operation respective to the touch pattern.

The area touch motion may be analyzed by using at least one of a shape of the area touch motion, a surface area of the area touch motion, a position of the area touch motion, a movement rate (or speed) of the area touch motion, and a movement trajectory of the area touch motion.

A method for controlling a display in a mobile terminal in accordance with another embodiment as broadly described herein may include displaying an execution screen of an application, receiving an area touch motion respective to one area of the execution screen, analyzing the area touch motion, and controlling an application as an application control operation corresponding to the received area touch motion based upon the analyzed result.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touchscreen configured to display at least one content item on a screen and to receive an area touch motion corresponding to one area of the screen, the area touch motion corresponding to a hand touch of the screen by at least one of a substantially full length of a hand or a substantially full width of a hand; and
   a controller configured to:
     analyze the received area touch motion and to control a specific content item of the at least one content item displayed on the screen in accordance with a content control operation corresponding to the received area touch motion based on a result of the analysis;
     receive a vertically oriented initial touch corresponding to a substantially fall palm and finger extension of a hand and a movement corresponding to a folding or squeezing of the hand into a fist, and
     perform a control operation on multiple content items touched by the initial touch, the control operation comprising at least one of fixing one or more of the multiple content items at particular locations, copying one or more of the multiple content items, pausing execution of one or more of the multiple content items, grasping one or more of the multiple content items for a subsequent control operation, or terminating execution of one or more of the multiple content items.

2. The mobile terminal of claim 1, wherein the controller is configured to analyze the received area touch motion based on at least one of a shape of the area touch motion, a surface area of the area touch motion, a position of the area touch motion, a movement rate of the area touch motion, or a movement trajectory of the area touch motion.

3. The mobile terminal of claim 1, wherein the controller is configured to determine whether the analyzed area touch motion corresponds to a predetermined touch pattern, and to perform a content control operation corresponding to the predetermined touch pattern accordingly.

4. The mobile terminal of claim 3, wherein, when the analyzed area touch motion corresponds to a first touch pattern, the controller is configured to perform at least one of an operation of dividing a display area related to the specific content item or an operation of deleting the specific content item.

5. The mobile terminal of claim 3, wherein, when the analyzed area touch motion corresponds to a second touch pattern, the controller is configured to perform at least one of an operation of generating a new content item based on the specific content item, an operation of compressing the specific content item, an operation of terminating execution of the specific content item, an operation of reducing a size of the specific content item or an operation of deleting the specific content item.

6. The mobile terminal of claim 3, wherein, when the analyzed area touch motion corresponds to a third touch pattern, the controller is configured to perform at least one of an operation of decompressing the specific content item or an operation of enlarging a size of the specific content item.

7. The mobile terminal of claim 3, wherein, when the analyzed area touch motion corresponds to a fourth touch pattern, the controller is configured to perform at least one of an operation of moving the specific content item, an operation of selecting the specific content item, an operation of compressing the specific content item or an operation of backing-up the specific content item.

8. The mobile terminal of claim 3, wherein, when the analyzed area touch motion corresponds to a fifth touch pattern, the controller is configured to perform at least one of an operation of copying the specific content item, an operation of pasting the specific content item, an operation of pausing execution of the specific content item or an operation of terminating execution of the specific content item.

9. The mobile terminal of claim 1, wherein the at least one content item comprises at least one of an icon, a thumbnail image or a file image displayed on the screen.

10. A method of controlling a mobile terminal, comprising:
   displaying a plurality of content items on a screen within a touchscreen;
   receiving an area touch motion corresponding to one area of the screen, comprising receiving a hand touch corresponding to at least one of a substantially full length of a hand or a substantially full width of a hand;
   analyzing the received area touch motion; and
   performing a control operation on a specific content item of the plurality of content items corresponding to the received area touch motion based on a result of the analysis, wherein receiving a hand touch comprises receiving a first vertically oriented initial touch corresponding to a substantially full palm and finger extension of a hand and a first movement corresponding to a folding or squeezing of the hand into a fist, and wherein performing a control operation on a specific content item of the plurality of content items comprises performing a first control operation on multiple content items touched by the first initial touch in response to the first initial touch and the first movement, the first control operation comprising at least one of fixing one or more of the multiple content items at particular locations, copying one or more of the multiple content items, pausing execution of one or more of the multiple content items, grasping one or more of the multiple content items for a subsequent control operation, or terminating execution of one or more of the multiple content items.

11. The method of claim 10, wherein analyzing the received area touch motion comprises analyzing at least one of a shape of the area touch motion, a surface area of the area touch motion, a position of the area touch motion, a movement rate of the area touch motion, or a movement trajectory of the area touch motion.

12. The method of claim 10, wherein analyzing the area touch motion comprises matching the received area touch motion with one of a plurality of previously stored touch patterns, and performing a control operation on the specific content item corresponding to the matched touch pattern.

13. The method of claim 12, wherein receiving an area touch motion corresponding to one are of the screen comprises contacting multiple content items of the plurality of content items displayed on the screen simultaneously by the hand touch, and performing the control operation on the multiple content items.

14. The method of claim 12, wherein receiving an area touch motion corresponding to one area of the screen comprises receiving the hand touch proximate multiple content items of the plurality of content items displayed on the screen.

15. The method of claim 12, wherein receiving a hand touch further comprises receiving a second vertically oriented initial touch corresponding to a substantially full length of a side of a hand and a second movement corresponding to a vertical upward or downward movement of the hand touch, and wherein performing a control operation on a specific content item of the plurality of content items comprises performing a second control operation in response to receiving the second initial touch and second movement, the second control operation comprising at least one of dividing a display area related to the specific content item or deleting the specific content item.

16. The method of claim 12, wherein receiving a hand touch further comprises receiving a third vertically oriented initial touch corresponding to a substantially full length of a side of a hand and a third movement corresponding to a folding or squeezing of the hand into a fist, and wherein performing a control operation on a specific content item of the plurality of content items comprises performing a third control operation in response to receiving the third initial touch and third movement, the third control operation comprising at least one of compressing the specific content item, terminating execution of the specific content item, reducing a display size of the specific content item, or deleting the specific content item.

17. The method of claim 12, wherein receiving a hand touch further comprises receiving a fourth initial touch corresponding to a hand that is folded into a fist and a fourth movement corresponding to an opening or unfolding of the fist to a fully extended state such that a substantially full length of a side of the hand contacts the screen, and wherein performing a control operation on a specific content item of the plurality of content items comprises performing a fourth control operation in response to receiving the fourth initial touch and fourth movement, the fourth control operation comprising at least one of decompressing the specific content item, terminating execution of the specific content item or enlarging a display size of the specific content item.

18. The method of claim 12, wherein receiving a hand touch further comprises receiving a fifth vertically oriented initial touch corresponding to a substantially full length of a side of a hand and a fifth movement corresponding to a horizontal sliding of the hand touch, and wherein performing a control operation on a specific content item of the plurality of content items comprises performing a fifth control operation in response to receiving the fifth initial touch and fifth movement, the fifth control operation comprising at least one of moving the specific content item, selecting the specific content item, compressing the specific content item, or backing up the specific content item.

\* \* \* \* \*